United States Patent
Mani et al.

(10) Patent No.: US 8,756,044 B2
(45) Date of Patent: Jun. 17, 2014

(54) GRAPHICAL PARTITIONING FOR PARALLEL EXECUTION OF EXECUTABLE BLOCK DIAGRAM MODELS

(75) Inventors: Ramamurthy Mani, Wayland, MA (US); Katalin Maria Popovici, Natick, MA (US); Hidayet Tunc Simsek, Newton, MA (US); Benjamin Charles Martin, Natick, MA (US); John Edward Ciolfi, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 930 days.

(21) Appl. No.: 12/895,209

(22) Filed: Sep. 30, 2010

(65) Prior Publication Data

US 2011/0078652 A1    Mar. 31, 2011

Related U.S. Application Data

(63) Continuation-in-part of application No. 11/141,878, filed on May 31, 2005, now Pat. No. 8,447,580.

(60) Provisional application No. 61/349,002, filed on May 27, 2010.

(51) Int. Cl.
G06F 17/50    (2006.01)

(52) U.S. Cl.
USPC .................................................. 703/13; 703/6

(58) Field of Classification Search
None
See application file for complete search history.

(56) References Cited

U.S. PATENT DOCUMENTS

| | | | |
|---|---|---|---|
| 5,428,803 A | 6/1995 | Chen et al. | |
| 5,625,831 A | 4/1997 | Priest et al. | |
| 5,649,198 A | 7/1997 | Shibata et al. | |
| 5,794,012 A | 8/1998 | Averill | |
| 5,838,948 A | 11/1998 | Bunza | |
| 5,870,588 A | 2/1999 | Rompaey et al. | |
| 5,878,241 A | 3/1999 | Wilkinson et al. | |

(Continued)

FOREIGN PATENT DOCUMENTS

EP    07 807 63 A1    6/1997

OTHER PUBLICATIONS

Popovici, Katalin et al., "Platform-Based Software Design Flow for Heterogeneous MPSoC," ACM Transactions on Embedded Computing Systems, vol. 7(4):39:1-39:23 (2008).

(Continued)

Primary Examiner — Omar Fernandez Rivas
Assistant Examiner — Herng-Der Day
(74) Attorney, Agent, or Firm — Harrity & Harrity, LLP

(57) ABSTRACT

Exemplary embodiments allow executable graphical models, such as block diagram models, to be graphically partitioned for execution on concurrent computing resources. Embodiments allow model components to be grouped into subtasks that are affiliated with tasks associated with concurrent computing resources. Tasks and sub graphs can be mapped to concurrent computing resources according to characteristics, such as sample time, solver type, etc. Embodiments further allow mappings to be visually indicated to a user via various display techniques including color, text, icons, shading, grouping of identifiers, etc. Concurrently executing portions of a model allows model results to be obtained faster than can be obtained when models are executed on a single computing resource, such as a single processor.

16 Claims, 35 Drawing Sheets

(56) References Cited

U.S. PATENT DOCUMENTS

| | | | |
|---|---|---|---|
| 6,789,054 | B1 | 9/2004 | Makhlouf |
| 6,877,155 | B1 | 4/2005 | Lindsey |
| 7,401,333 | B2 | 7/2008 | Vandeweerd |
| 7,487,080 | B1 * | 2/2009 | Tocci et al. .................... 703/22 |
| 7,509,244 | B1 * | 3/2009 | Shakeri et al. .................. 703/7 |
| 7,552,042 | B1 | 6/2009 | Brebner et al. |
| 7,614,037 | B2 * | 11/2009 | Gavrilov ...................... 717/105 |
| 8,549,470 | B2 * | 10/2013 | Ciolfi et al. .................. 717/105 |
| 8,620,629 | B1 * | 12/2013 | Li et al. ........................... 703/2 |
| 2002/0144010 | A1 | 10/2002 | Younis et al. |
| 2003/0056202 | A1 | 3/2003 | May et al. |
| 2003/0118081 | A1 | 6/2003 | Philips et al. |
| 2004/0006584 | A1 | 1/2004 | Vandeweerd |
| 2005/0060408 | A1 | 3/2005 | McIntyre et al. |
| 2005/0267901 | A1 | 12/2005 | Irlen |
| 2006/0064178 | A1 | 3/2006 | Butterfield et al. |
| 2006/0101104 | A1 | 5/2006 | Bhanot et al. |
| 2006/0173601 | A1 | 8/2006 | Bassiere et al. |
| 2006/0235548 | A1 | 10/2006 | Gaudette |

OTHER PUBLICATIONS

Andersson et al., "Utilizing UML in SDL-based development", Computer Network, vol. 35, pp. 613-625, 2001.

Becker et al., "SIMOO-RT—An Object-Oriented Framework for the Development of Real-Time Industrial Automation Systems", IEEE Transactions of Robotics and Automation, vol. 18(4), pp. 421-430 (2002).

He et al., "A generic framework for modeling heterogeneous real-time systems", Computer Standards & Interfaces, vol. 28, pp. 43-58, 2005.

Ramos-Hernandez et al., "A novel object-oriented environment for distributed process control systems", Control Engineering Practice, vol. 13, pp. 213-230, 2005.

Redell, "The AIDA toolset for design and implementation analysis of distributed real-time control systems", Microprocessors and Microsystems, IPC Business Press Ltd., vol. 28(4), pp. 163-182, 2004.

International Search Report for Application No. PCT/US2006/021085, dated Dec. 8, 2006, 6 pages.

European Office Action for Application No. 06771710.8, dated Jul. 7, 2009, 4 pages.

* cited by examiner

Task Group: Task Group 1

| | Color | Name | Period | Priority | Core Affinity |
|---|---|---|---|---|---|
| 335 | C | Continuous | Continuous | 10 | 1 |
| 340 | 1 | Fast 1 | 0.001 | 20 | 2 |
| 345 | 2 | Fast 2 | 0.001 | 20 | 3 |
| 350 | 3 | Slow | 0.01 | 30 | 4 |
| | | | | | |
| | | | | | |

[Insert Task] [Delete Task]

[OK] [Cancel] [Help] [Apply]

*Fig. 4*

Task Group: Task Group 1

[Insert Task] [Delete Task]　　　　　　　　　　　　　　　　　　　　　　　　　　　　　　[Batch Move]

| Color (410) | Name (415) | Period (420) | Priority (425) | Core Affinity (430) | Mapped Subgraphs (710) | Move to Task (Batch mode) (720, 730) |
|---|---|---|---|---|---|---|
| C | Continuous | C | 10 | 1 | Plant Section 1 | ▽ |
|   |   |   |   |   | Plant Section 2 | ▽ |
| 1 | Fast 1 | 0.001 | 20 | 3 | Plant Section 1 (0.001) | ▽ |
|   |   |   |   |   | Controller Section 1 (0.001) | ▽ |
| 2 | Fast 2 | 0.001 | 20 | 4 | Plant Section 1 (0.001) | ▽ |
|   |   |   |   |   | Plant Section 2 (0.001) | ▽ |
| 3 | Slow | 0.01 | 30 | 2 | Controller Section 1 (0.01) | ▽ |
|   |   |   |   |   | Controller Section 2 (0.01) | ▽ |
| Unmapped | Unmapped | -- | -- | -- | User Controls (0.01) | Slow |
|   |   |   |   |   | Controller Section 2 (0.001) | Fast 2 |
|   |   |   |   |   | Plant Section 2 (0.001) | Fast 1 |

635

[OK] [Cancel] [Help] [Apply]

*Fig. 7*

Task Group: Task Group 1

800

| | Insert Task | Delete Task | | | | | |
|---|---|---|---|---|---|---|---|
| Color | Name | Period | Priority | Core Affinity | Mapped Subgraphs 710 / 810 | | |
| C | Continuous | C | | | Plant Section 1 | Plant Section 2 | |
| 1 | Fast 1 | 0.001 | | | Plant Section 1 | Plant Section 2 | |
| 2 | Fast 2 | 0.001 | | | Controller Section 1 | Controller Section 2 | |
| 3 | Slow | 0.01 | | | Plant Section 1 | Plant Section 2 | Controller Section 1 | Controller Section 2 |
| Unmapped | Unmapped | --- | --- | --- | User Inputs | | |

[ OK ]  [ Cancel ]  [ Help ]  [ Apply ]

*Fig. 8*

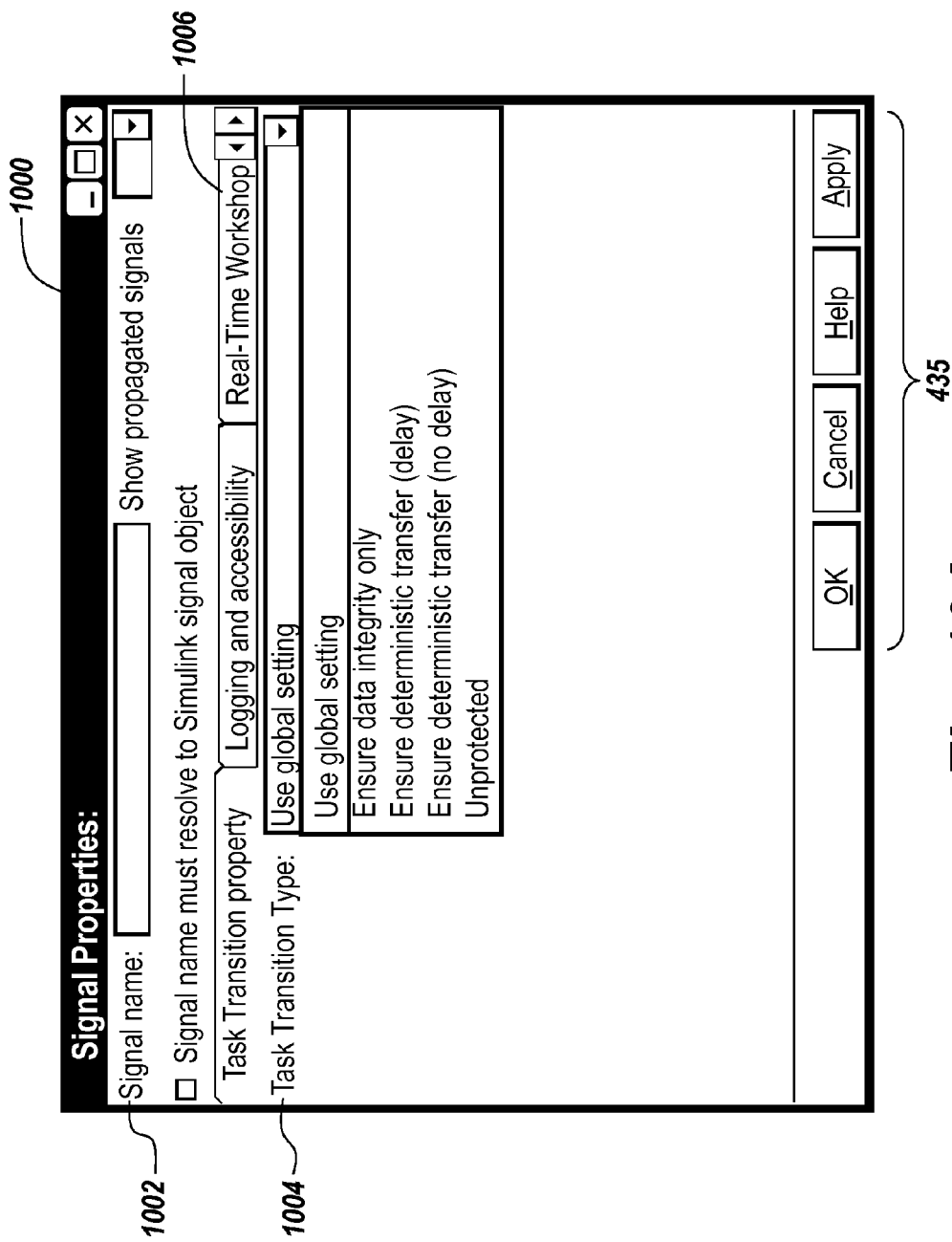

```
int main(int argc, char **argv)
{
  int i;

timer_t timerId;
  struct sigevent sev;
  struct sigaction sa;
  sigset_t mask;
  struct itimerspec its;
  long stNanoSec;

pthread_t baseRateThread;
  pthread_t subRateThread[4];
  struct sched_param sp;
  pthread_attr_t attr;

size_t stackSize;

sp.sched_priority = sched_get_priority_max(SCHED_FIFO);
  ret = sched_setscheduler(0, SCHED_FIFO, &sp);
  pthread_attr_init(&attr);

/* Initialize semaphores used for thread synchronization */
  ret = sem_init(&timerSem, 0, 0);
  ret = sem_init(&stopSem, 0, 0);

pthread_attr_init(&attr);
  ret = pthread_attr_setinheritsched(&attr, PTHREAD_EXPLICIT_SCHED);
  ret = pthread_attr_setdetachstate(&attr, PTHREAD_CREATE_DETACHED);
  stackSize = (512 > PTHREAD_STACK_MIN) ? 512:PTHREAD_STACK_MIN;
  ret = pthread_attr_setstacksize(&attr, stackSize);

for (i = 0; i < 4; i++) {
    taskId[i] = i;
    ret = sem_init(&subrateTaskSem[i], 0, 0);
    sp.sched_priority = 40 - i - 1;
    ret = pthread_attr_setschedparam(&attr, &sp);
    ret = pthread_create(&subRateThread[i], &attr, (void *) subrateTask, (void *) &taskId[i]);
  }                                                                                              ⎫ Creation
                                                                                                 ⎬ of four
                                                                                                 ⎭ threads // Continued next figure
```

*Fig. 14A*

// Continued from previous figure

```
/* Create base rate task */
  ret = pthread_create(&baseRateThread, &attr, (void *) baseRateTask, NULL);
  pthread_attr_destroy(&attr);

/* Install a signal handler for base rate timer */
  sa.sa_flags = SA_SIGINFO | SA_RESTART;
  sa.sa_sigaction = handler;
  sigemptyset(&sa.sa_mask);
  ret = sigaction(SIGRTMIN, &sa, NULL);

/* Create base rate timer */
  sev.sigev_notify = SIGEV_SIGNAL;
  sev.sigev_signo = SIGRTMIN;
  sev.sigev_value.sival_ptr = &timerId;
  ret = timer_create(CLOCK_REALTIME, &sev, &timerId);

/* real-time scheduling timer */
  stNanoSec = (long)(0.0333 * 1e9);
  its.it_value.tv_sec = stNanoSec / 1000000000;
  its.it_value.tv_nsec = stNanoSec % 1000000000;
  its.it_interval.tv_sec = its.it_value.tv_sec;
  its.it_interval.tv_nsec = its.it_value.tv_nsec;
  ret = timer_settime(timerId, 0, &its, NULL);
  CHECK_STATUS(ret, "timer_settime");

/* Wait for a stopping condition. */
  sem_wait(&stopSem);
}
```

Creation of base-rate thread tied to a timer interrupt

*Fig. 14B*

```
void baseRateTask(void *arg)
{
  volatile boolean_T noErr;
  int_T i;
  int_T tasksSampleHits[4] = { 0, 10, 10, 100};

noErr = (rtmGetErrorStatus(PlantControllerModel_M) == (NULL)) &&
              !rtmGetStopRequested(PlantControllerModel_M);

while (noErr ) {
    /* Wait for the next timer interrupt */
    sem_wait(&timerSem);
    for (i = 0; i < 4; i++) {
      if (rtmStepTask(PlantControllerModel_M, tasksSampleHits[i])) {
        sem_post(&subrateTaskSem[i]);
      }
    }

AdvanceTaskCounters();

noErr = (rtmGetErrorStatus(PlantControllerModel_M) == (NULL)) &&
                !rtmGetStopRequested(PlantControllerModel_M);
  }                    /* while */ sem_post(&stopSem);
}
```

Body of base rate thread

*Fig. 14C*

```
sem_t subrateTaskSem[4];
sem_t timerSem, stopSem;
int taskId[4];

void subrateTask(void *arg)
{
  int tid = *((int *) arg);
  int subRateId = tid;
  while (1) {
    sem_wait(&subrateTaskSem[tid]);
    PlantControllerModel_step(subRateId);
} static void handler(int sig, siginfo_t *si, void *uc)
{
   sem_post(&timerSem);
}
```

Body of each thread that calls code for subgraphs

One sample function for all subgraphs that are executed as part of the slowest task (3)

1520

```
void PlantControllerModel_step3()
{
  PlantSection1_TID3();
  PlantSection1_UpdateTID3();

PlantSection2_TID3();
  PlantSection2_UpdateTID3();

ControllerSection1_TID1();
  ControllerSection1_UpdateTID1();

ControllerSection2_TID1();
  ControllerSection2_UpdateTID1();
}
```

PlantControllerModel.c

1510

```
void PlantControllerModel_step(int_T tid)
{
  switch (tid) {
   case 0 :
    PlantControllerModel_step0();
    break;
   case 1 :
    PlantControllerModel_step1();
    break;
   case 2 :
    PlantControllerModel_step2();
    break;
   case 3 :
    PlantControllerModel_step3();
    break;
   default :
    break;
  }
}
```

Common function that each of the four threads calls. Each thread passes an integer ranging from 1 through 4, respectively.

PlantSection1.c ⸺ 1610

```
void PlantSection1_TID2( )
{
  mr_PlantSection1_TID2(&PlantControllerModel_B.ModelBlk_1_P1o1);

PlantControllerModel_DWork.PT_1_buf = PlantControllerModel_B.ModelBlk_1_P1o1;
  sem_post(&PlantControllerModel_DWork.PT_1_sem);
}
```

ControllerSection1.c ⸺ 1620

```
void ControllerSection1_TID2( )
{
  int_T rtb_PT_1;

sem_wait(&PlantControllerModel_Dwork.PT_1_sem);
  rtb_PT_1 = PlantControllerModel_Dwork.PT_1_buf;

mr_ControllerSection1_TID0(&rtb_PT1);
}
```

*Fig. 16A*

PlantSection1.c ⸺ 1630

```
void PlantSection1_Init( )
{
  PlantControllerModel_DWork.f_buf1 = 0;
} void PlantSection1_TID2()
{
  mr_PlantSection1_TID2(&PlantControllerModel_B.ModelBlk_1_P1o1);

PlantControllerModel_DWork.PT_1_buf1[PlantControllerModel_Dwork.f_buf1] =
              PlantControllerModel_B.ModelBlk_1_P1o1;
  posix_mutex_lock(&PlantControllerModel_DWork.m_buf1);
  PlantControllerModel_DWork.f_buf1 = 1 - PlantControllerModel_DWork.f_buf1;
  posix_mutex_unlock(&PlantControllerModel_DWork.m_buf1);
}
```

ControllerSection1.c ⸺ 1640

```
void ControllerSection1_TID2( )
{
  int_T rtb_PT_1;

posix_mutex_lock(&PlantControllerModel_DWork.m_buf1);
  rtb_PT_1 = PlantControllerModel_DWork.PT_1_buf1[1-PlantControllerModel_Dwork.f_buf1];
  posix_mutex_unlock(&PlantControllerModel_DWork.m_buf1);

mr_ControllerSection1_TID0(&rtb_PT1);
}
```

*Fig. 16B*

PlantSection1.c — 1650

```
void PlantSection1_Init( )
{
  PlantControllerModel_DWork.f_buf1 = 0;
} void PlantSection1_TID2( )
{
  mr_PlantSection1_TID2(&PlantControllerModel_B.ModelBlk_1_P1o1);

PlantControllerModel_DWork.PT_1_buf1[PlantControllerModel_Dwork.f_buf1] =
             PlantControllerModel_B.ModelBlk_1_P1o1;
  PlantControllerModel_DWork.f_buf1 = 1 - PlantControllerModel_DWork.f_buf1;
}
```

ControllerSection1.c — 1660

```
void ControllerSection1_Init( )
{
   PlantControllerModel_DWork.f_buf2 = 1;
} void ControllerSection1_TID2( )
{
 int_T rtb_PT_1;

rtb_PT_1 = PlantControllerModel_DWork.PT_1_buf1[PlantControllerModel_Dwork.f_buf2];
 PlantControllerModel_DWork.f_buf2 = 1 - PlantControllerModel_DWork.f_buf2;

mr_ControllerSection1_TID0(&rtb_PT1);
}
```

*Fig. 16C*

Mutex_SFunc.c                                                    ─ 1810

```
mdlOutputs(SimStruct *S, int_T tid)
{
 if (strcmp(operation, "Write") == 0) {
    real_T *buf = ssGetDWork(S, 0);      // buffer
    int_T *flag = ssGetDWork(S, 1);      // flag
    *(buf     + (*flag)) = ssGetInputPortRealSignal(S, 0);

posix_mutex_lock(&ssGetDWork(S, 2);
    *flag = 1 – (*flag);
    posix_mutex_unlock(&ssGetDWork(S, 2);

} else { // Read
    real_T *buf = ssGetDWork(S, 0);      // buffer posix_mutex_lock(&ssGetDWork(S, 2));
    int_T *flag = ssGetDWork(S, 1);      // flag
    real_T localB = *(buf + (*flag));
    posix_mutex_unlock(&ssGetDWork(S, 2));
 }
 ...
}
```

*Fig. 18A*

Mutex_SFunc.tlc ╱─ *1820*

```
%function Outputs(block, system) Output

%if ISEQUAL(Operation, "Write")
   %assign buf  = LibBlockDWork(DWork[0], "", "", 0)
   %assign flag = LibBlockDWork(Dwork[1], "", "", 0)
   %assign y = LibBlockInputSignal(0, "", "", 0)
       *(% <buf> + (*%<flag>))= %<y>;

%assign mutexId = LibBlockDWork(DWork[2], "", "", 0)
   %<SLibCGIRMutexOp(1, %<mutexId>)>;
   *%<flag> = 1 –(*%<flag>);
   %<SLibCGIRMutexOp(2, %<mutexId>)>;

%else // Read
   %assign buf     = LibBlockDWork(DWork[0], "", "", 0)
   %assign mutexId = LibBlockDWork(DWork[2], "", "", 0)
   %<SLibCGIRMutexOp(1, %<mutexId>)>;
   %assign flag = LibBlockDWork(Dwork[1], "", "",  0)
   real_T localB = *(%<buf> + *(%<flag>));
   %<SLibCGIRMutexOp(2, %<mutexId>)>;
%endif %endfunction
```

*Fig. 18B*

Table which helps map proxy to task

Task Group: Task Group 1

[Insert Task] [Delete Task]  [Batch Move]

| Task Group | Color | Name | Period | Priority | Core Affinity | Mapped Subgraphs | Move to Task (Batch mode) |
|---|---|---|---|---|---|---|---|
| Base Timer | C | Continuous | C | 10 | 1 | Plant | ▽ |
| | 1 | Fast | 0.001 | 20 | 3 | Plant (0.001) | ▽ |
| | | | | | | Controller (0.001) | ▽ |
| | 2 | Slow | 0.01 | 30 | 4 | Plant (0.01) | ▽ |
| Alarm 1 | A1 | Ext Int 3 | Aperiodic | 30 | 1 | Controller: alarm_f | ▽ |
| Alarm 2 | A2 | Ext Int 5 | Aperiodic | 10 | 1 | Controller: alarm_g | ▽ |
| | Unmapped | Unmapped | -- | -- | -- | User Controls (0.01) | Slow |
| | | | | | | Controller (0.01) | Slow |

[OK] [Cancel] [Help] [Apply]

*Fig. 21*

GRAPHICAL PARTITIONING FOR PARALLEL EXECUTION OF EXECUTABLE BLOCK DIAGRAM MODELS

RELATED APPLICATIONS

The present application claims the benefit of U.S. Provisional Patent Application No. 61/349,002 filed May 27, 2010, and the benefit of U.S. Utility patent application Ser. No. 11/141,878 filed May 31, 2005 the contents of which are incorporated by reference in their respective entireties.

BACKGROUND

Various classes of graphical models or graphical programming describe computations that can be performed on application specific computational hardware, such as a computer, microcontroller, field programmable gate array (FPGA), or custom hardware. Graphical models can be complex and computationally intensive. As a result, executing the models in real-time may not be feasible in conventional processing environments using a single processing device, such as a single core.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 4 illustrates an exemplary user interface for interacting with model partitions;

FIG. 7 illustrates an alternative implementation of a user interface for performing mapping operations for a graphical model;

FIG. 8 illustrates an exemplary user interface that includes icons for identifying sub graphs or components in a model;

FIGS. 10A and 10B illustrate application program interfaces for mapping sub graphs to tasks;

FIGS. 14A-D illustrate code examples for implementing a model on concurrent computing resources;

FIG. 15 illustrates code for a function that performs dispatch operations;

FIG. 16A illustrates a code example for a deterministic transfer communication between sub graphs;

FIG. 16B illustrates a code example for ensuring data integrity for communications between sub graphs;

FIG. 16C illustrates a code example for ensuring deterministic transfer delay for communications between sub graphs;

FIG. 18A illustrates a code example for implementing an S function in an embodiment of the invention;

FIG. 18B illustrates an exemplary TLC implementation of an embodiment of the invention;

FIG. 21 illustrates an exemplary data store for use with proxy blocks in an embodiment of the invention;

DETAILED DESCRIPTION

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Exemplary embodiments partition executable graphical models into units that can be mapped onto parallel processing resources and then concurrently processed. For example, embodiments can identify model components sharing characteristics, such as a sample rate, and may group the components together into units (e.g., sub graphs, sub systems, modules, etc.). These units may be mapped for processing onto a resource (e.g., a core, processor, thread, process, etc.) that can be separate from another processing resource. In addition, the units may further be mapped to be processed in parallel with other units in the model. Concurrent processing of the units may allow a model to be executed in a fraction of the time that it would take if the model were executed on a single processing device using conventional techniques.

Embodiments can allow a user to graphically specify how portions of a model should be partitioned and mapped for concurrent processing. And, embodiments can be configured to programmatically partition and map models on behalf of the user. For example, programmatic partitioning and mapping of models may be particularly beneficial to users when models are large and/or complex.

Embodiments can include user interfaces that allow users to identify how a model is partitioned and mapped, concurrent computing resources for processing respective portions of a model, parameters for code generated from the model, etc. Still further embodiments can provide tools that allow users to verify, validate, test, document, publish, etc., models that interact with concurrent processing resources.

Embodiments allow graphical models, such as executable block diagrams, to be configured as parallel deployment diagrams. Diagrams operating as parallel deployment diagrams may include components, such as:

(1) a mechanism for graphically partitioning a block-diagram into sub graphs that capture potential parallelism in the design without requiring that final deployment hardware for the design be fully known/identified, (2) a mechanism for graphically expressing actual compute elements present on a concurrent computing platform on which the design will be deployed or targeted, and (3) a mechanism for mapping sub graphs to the actual compute elements.

Exemplary System

Figure 1:
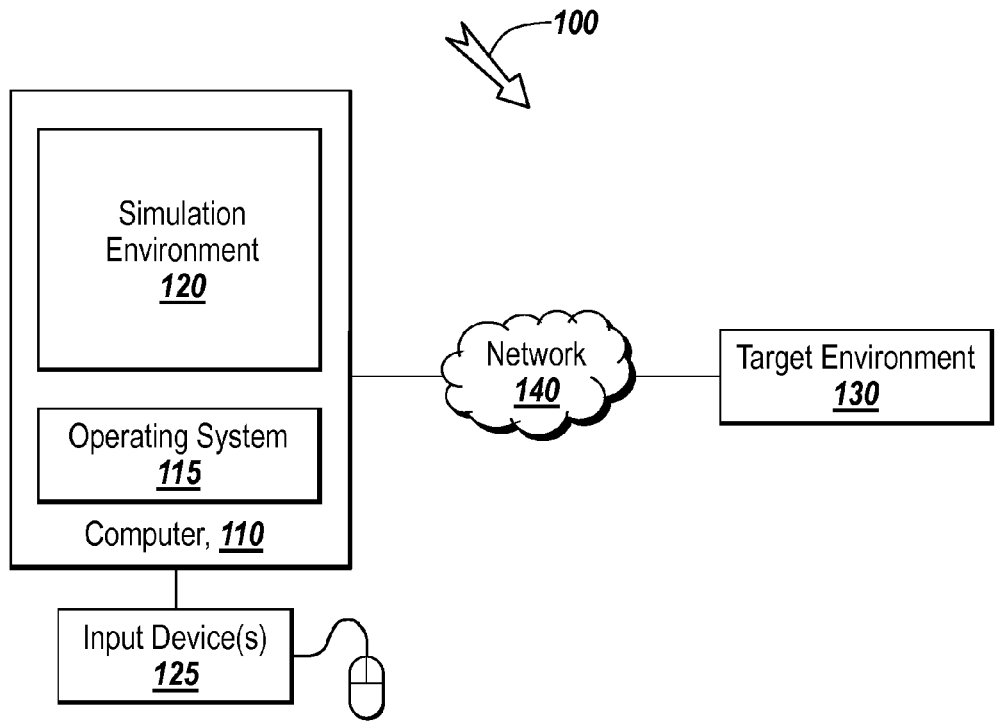
FIG. 1 illustrates an exemplary system for practicing embodiments of the invention.

FIG. 1 illustrates an exemplary system 100 for practicing an embodiment. For example, system 100 may be used to design, simulate, test, and/or deploy models that make use of concurrent computing resources. System 100 may include computer 110, input device 125, network 140, and target environment 130. The system in FIG. 1 is illustrative and other embodiments of system 100 can include fewer devices, more devices, and/or devices in configurations that differ from the configuration of FIG. 1.

Computer 110 may include a device that performs processing operations, display operations, communication operations, etc. For example, computer 110 may include logic, such as one or more processing or storage devices, that can be used to perform and/or support processing activities on behalf of a user. Embodiments of computer 110 may include a desktop computer, a laptop computer, a client, a server, a mainframe, a personal digital assistant (PDA), a web-enabled cellular telephone, a smart phone, smart sensor/actuator, or another computation or communication device that executes instructions for performing one or more activities and/or to generate one or more results.

Computer 110 may further perform communication operations by sending data to or receiving data from another device, such as a server (not shown in FIG. 1). Data may refer to any type of machine-readable information having substantially any format that may be adapted for use in one or more networks and/or with one or more devices. Data may include digital information or analog information. Data may further be packetized and/or non-packetized.

An embodiment of computer 110 may include simulation environment 120 and operating system 115. Simulation environment 120 may provide a computing environment that allows users to perform simulation or modeling tasks related to disciplines, such as, but not limited to, mathematics, science, engineering, medicine, business, etc. Simulation environment 120 may support one or more applications that execute instructions to allow a user to construct a model having executable semantics. In an embodiment, simulation environment 120 may execute the model to produce a result.

Models used with exemplary embodiments of the invention may include information in a textual or graphical form. For example, a model may be a textual model or graphical model that can be a time-based model (e.g., differential equation models, difference equation models, discrete-time models, or continuous-time models with or without algebraic constraints, etc.), event-based model, state transition model, data flow model, component diagram, entity flow diagram, equation-based language diagram, etc.

In an embodiment, simulation environment 120 can include a component, such as a software module, that partitions graphical models in a manner that supports concurrently processing the partitions. Simulation environment 120 can further provide user interfaces that facilitate user interactions with respect to graphically partitioning and concurrently executing graphical models.

Operating system 115 may manage hardware and/or software resources associated with computer 110. For example, operating system 115 may manage tasks associated with receiving user inputs, operating computer 110, allocating memory, prioritizing system requests, etc. In an embodiment, operating system 115 may be a virtual operating system. Embodiments of operating system 115 may include Linux, Mac OS, Microsoft Windows, Solaris, UNIX, etc. Operating system 115 may further run on a virtual machine, which can be provided by computer 110.

Computer 110 can further include one or more display devices for displaying information to a user. In an embodiment, the display may include a cathode ray tube (CRT), plasma display device, light emitting diode (LED) display device, liquid crystal display (LCD) device, etc. Embodiments of the display may be configured to receive user inputs (e.g., via a touch sensitive screen) when desired. In an embodiment, the display can provide one or more graphical user interfaces (GUIs) to a user. The GUIs may display a model, inputs for a model (e.g., user specified objectives, constraints, display characteristics, task/sub graph mappings, etc.), model outputs, graphical representations of registers, representations of tasks, representations for concurrent computing resources, etc.

Input device 125 may include logic to receive input from a user. For example, input device 125 may transform a user motion or action into a signal or message that can be interpreted by computer 110. Input device 125 can include, but is not limited to, keyboards, pointing devices, biometric devices, accelerometers, microphones, cameras, haptic devices, etc.

Network 140 may include any network capable of transferring data (e.g., packet data or non-packet data). Implementations of network 140 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.10, etc.

Network 140 may include network devices, such as routers, switches, firewalls, and/or servers (not shown). Network 140 may be a hardwired network using wired conductors and/or optical fibers and/or may be a wireless network using free-space optical, radio frequency (RF), and/or acoustic transmission paths. In an implementation, network 140 may be a substantially open public network, such as the Internet. In another implementation, network 140 may be a more restricted network, such as a corporate virtual network. Implementations of networks and/or devices operating on networks described herein are not limited to any particular data type, protocol, architecture/configuration, etc. For example, in an embodiment, network 140 may be a quantum network that uses quantum-compatible networking protocols.

Target environment 130 may include logic that executes instructions to perform one or more operations. In an embodiment, target environment 130 can include registers for storing information and processing logic adapted to concurrently execute code generated from one or more models. In an embodiment, target environment 130 can include real-time logic for performing processing operations in real-time using two or more processing devices, threads, etc. For example, target environment 130 may include a real-time operating system and hardware that are configured to process received signals or events in real-time or to execute simulations in real-time.

Exemplary embodiment of target environment 130 can include FPGAs, application specific integrated circuits (ASICs), application specific instruction-set processors (ASIPs), digital signal processors (DSPs), graphics processor units (GPUs), programmable logic devices (PLDs), etc. Target environments 130 can further include a single processor that includes two or more types of logic, such as cores. Target environments 130 can be configured to support multi-threaded or multi-process applications using FPGAs, ASICs, ASIPs, DSPs, GPUs, PLDs, cores, etc.

Exemplary Distributed Environment

Distributed implementations may allocate processing activities across two or more cores in a single processing device, allocate processing across multiple processing devices installed within a single enclosure, and/or allocate processing across multiple types of processing logic connected by a network. For example, a distributed environment may make remote concurrent computing resources available to computer 110 to allow simulation environment 120 to parallel process portions of a graphical model.

Figure 2:
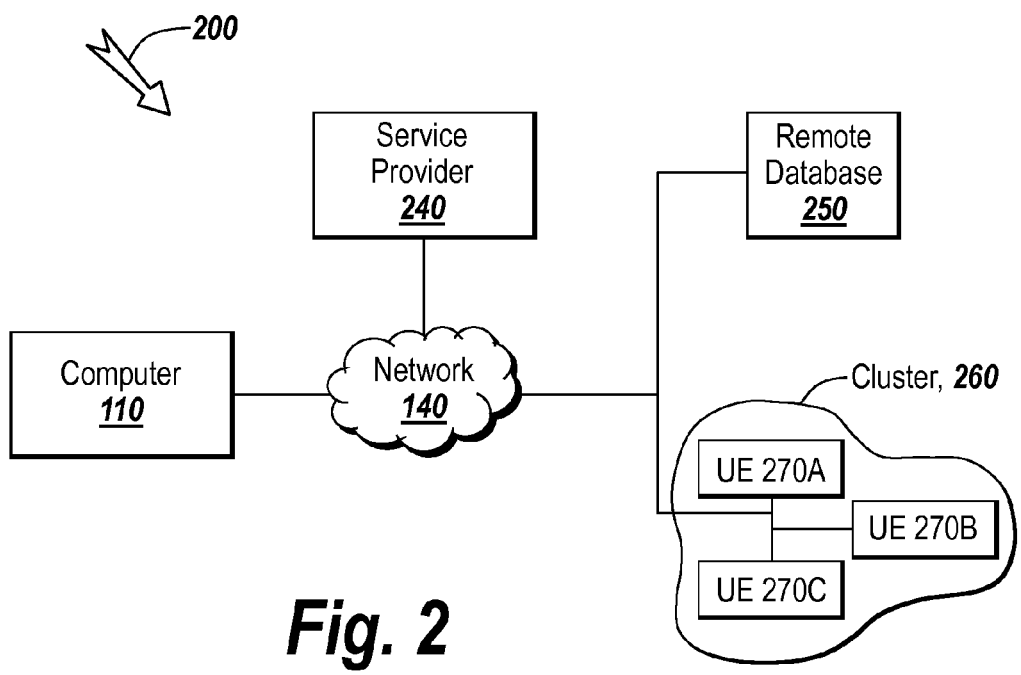
FIG. 2 illustrates an exemplary environment for performing distributed processing.

FIG. 2 illustrates an exemplary system that can be used to practice embodiments of the invention using a distributed computing environment. System 200 may include computer 110, network 140, service provider 240, remote database 250 and cluster 260. The implementation of FIG. 2 is exemplary and other distributed implementations of the invention may include more devices and/or components, fewer devices and/or components, and/or devices/components in configurations that differ from the exemplary configuration of FIG. 2.

Computer 110 and network 140 may be configured as described in connection with FIG. 1. Service provider 240 may include a device that makes a service available to another device. For example, service provider 240 may include an entity that provides one or more services to a destination using a server and/or other devices. Services may include instructions that are executed by a destination to perform an operation. Alternatively, a service may include instructions that are executed on behalf of a destination to perform an operation on the destination's behalf.

Assume, for sake of example, that a service provider operates a web server that provides one or more web-based services to a destination, such as computer 110. The web-based services may allow computer 110 to perform distributed processing on behalf of block diagrams. The web-based services may also allow computer 110 to view results of the concurrent processing via a display device. In one implementation, a customer (user) may receive services on a subscription basis.

A subscription may include substantially any type of arrangement, such as monthly subscription, a per-use fee, a fee based on an amount of information exchanged between service provider 240 and the customer, a fee based on a number of processor cycles used by the customer, a fee based on a number of processors used by the customer, etc.

Remote database 250 may include a device that stores machine-readable information for use by other devices, such as computer 110. In one embodiment, remote database 250 may include a data store, an array or grid of storage devices (e.g., hard disks, optical disks, solid-state storage devices, etc.) for storing information and/or data, e.g., variables, results, models, generated code, specifications, constraints, application program interfaces (APIs), processing configurations, etc. Units of execution 270 may include applications that are running on computer 110, e.g., copies of a technical computing environment.

Cluster 260 may include a group of processing devices, such as units of execution 270A, B, and C, that can be used to perform remote processing (e.g., distributed processing, parallel processing, etc.). Units of execution 270 may include hardware and/or hardware/software based logic that perform processing operations on behalf of a requesting device, such as computer 110. In an embodiment, units of execution 270A, B, and C may each compute a partial result that can be combined into an overall result and/or units of execution 270A, B, and C may each compute independent results. Devices in cluster 260 may be configured to support virtual machines and/or other techniques for making a plurality of processing resources and/or applications available over a network.

Exemplary Model Partitioning Technique

Exemplary embodiments can make use of computational elements, such as processors, cores, etc., to process portions of a model. Embodiments can further use computing tasks (hereinafter tasks), such as operating system threads, fibers, processes, etc., to concurrently process portions of a model. Embodiments can further use methodologies for graphically partitioning a model in a way that supports concurrently processing the model faster than if the entire model were processed using a single computational element or task. For example, a first methodology can separate a model design into components, where the components are coupled together using signal interconnections. Component boundaries can indicate potential points at which the design can be broken into a separate section, or partition. In the first methodology, respective sections may be deployed to different concurrent computing resources.

Still referring to the first methodology, a component can contain a piece of the original block-diagram. This diagram piece can include one or more sub graphs, where each sub graph, in a time-based diagram, is intended to run at a specified sample time or rate. In the first methodology, the block diagram portion within a component may be viewed as being partitioned into sub graphs, where each sub graph is contracted to run at a specific rate. This arrangement may be referred to as rate-grouping sub graphs and the sub graphs may be considered to be rate grouped sub graphs.

Sub graphs within a particular component may be configured to facilitate concurrent execution using concurrent computing resources. For example, if a model includes two components each including a sub graph, the components may be configured for concurrent processing using two cores residing in computer 110. This configuration may allow a model to execute faster than if the entire model were executed using a single core.

A second methodology may include a graphical technique that allows two or more computing elements or tasks to be represented collectively as a task group. In the second methodology, a task group can contain tasks that execute synchronously in time based on a single triggering condition, such as an event, a time, etc. For example, a triggering condition can include an interrupt from a timer running on a multi-core platform, an interrupt from an external source such as an external timer circuit, interrupt from an external physical source such as the detection of rotation of shaft in an automotive system, etc.

A task group further allows specification of task and task group properties useful for scheduling the running of computing resources. For instance, each task may be associated with a priority that allows the scheduler to determine execution order. Tasks can also be associated with policies, such as tie-breaking policies that handle situations where two tasks of identical priority contend for execution. In an embodiment, parameters can be used to specify properties for tasks. For example, two sets of parameters may be used within a task group to specify task properties. Here a first parameter, or a first set of parameters, can apply to an entire task group and a second parameter or set of parameters may apply to individual tasks in the group. Examples of a first parameter can include an interrupt source and a contention policy, and a second parameter can include timing of execution, priority, and core affinity.

Figure 3:
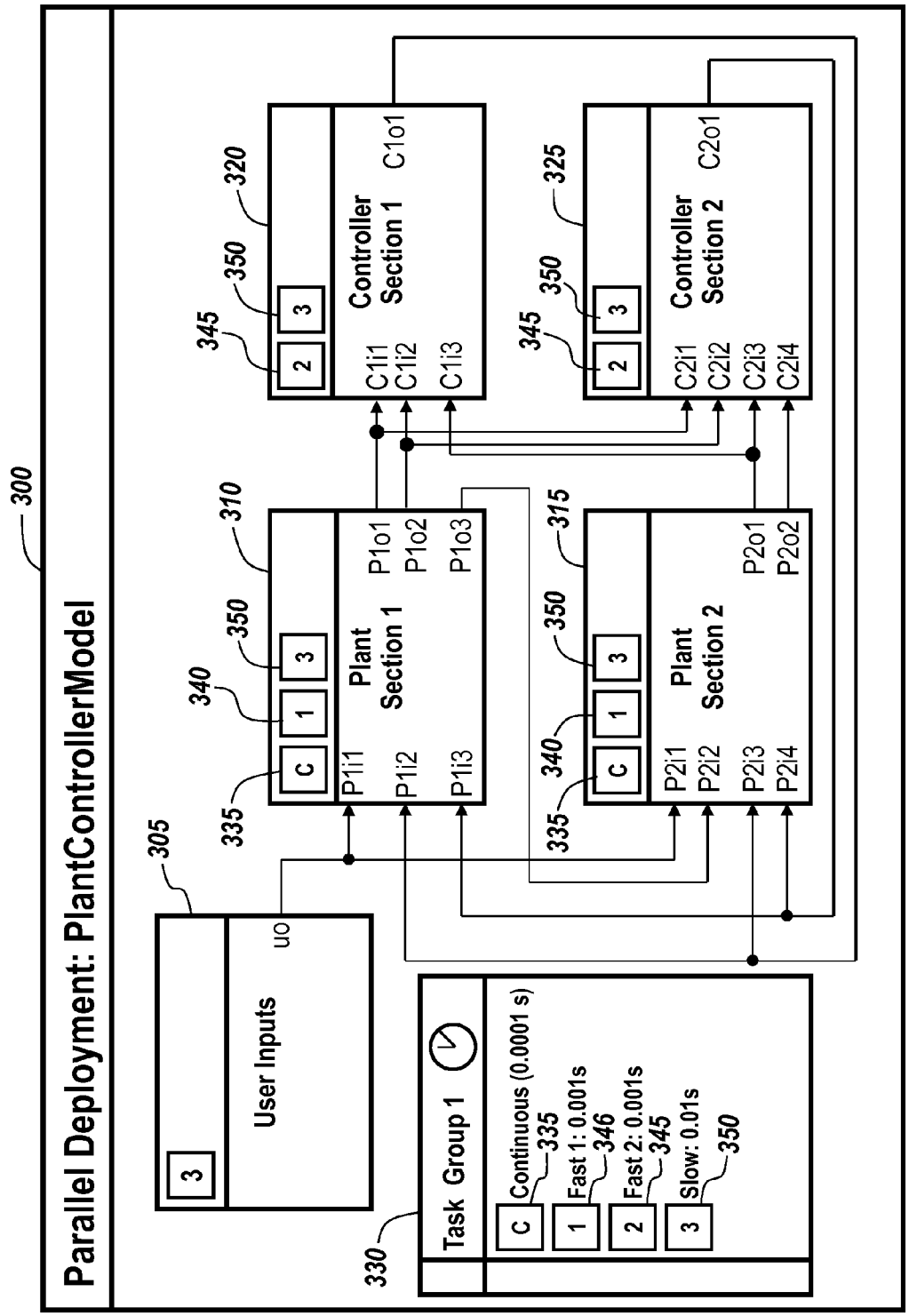
FIG. 3 illustrates an exemplary model that can be configured for concurrent computing.

FIG. 3 illustrates an exemplary graphical model 300 that can be configured to support concurrent computing capabilities. For example, model 300 may include partitions that can be grouped or assigned to various concurrent computing resources, such as hardware or software units of execution. Model 300 may include user inputs 305, plant section-1 310, plant section-2 315, controller section-1 320, controller section-2 325 and task group-1 330.

Model 300 may be considered to include three primary sections, namely user inputs 305 to plants 310, 315; the plant, which is made up of plants 310 and 315; and the controller, which is made up of controllers 320 and 325. The three sections of model 300 may be allocated to concurrent computing resources to speedup simulation (as compared to simulating on a single resource) during model design or for real-time hardware in the loop (HIL) simulation setup. In model 300, the plant and the controller are broken into two portions, respectively, to further exploit parallelism. For example, the plant is broken into plant section 310 and plant section 315. In embodiments, sections can be referred to as partitions, portions, sub graphs, etc., without departing from the spirit of the invention.

Plants 310 and 315 each contain a continuous-time section and two distinct discrete-time sample time sections (having sample times of 0.01 sec and 0.001 sec). In FIG. 3, these sections form the basis for breaking plants 310 and 315 into 3 different sub graphs. Sections or sub graphs in model 300 may be denoted using icons, such as continuous identifier 335, and sample time identifiers 340, 345, and 350. For example, sample time identifiers can represent a first fast sample time of 0.001 sec (identifier 340), a second fast sample time identifier of 0.001 sec (identifier 345), and a slow sample time identifier of 0.01 sec (identifier 350). Other implementations can use other types of identifiers such as symbols, text, highlighting, shading, fading, etc., for denoting sections of a model.

Continuous component 335 can be used to model the dynamics of the plant as a set of ordinary differential equations. Solving the set of equations numerically may require executing a solver of a certain type. For example, model 300 may use a fixed step or variable step solver. Model 300 may further use solvers that employ Euler's method, Heun's method, Bogacki-Shampine formula, Runge-Kutta formula, Dormand-Prince formula, etc.

Discrete components, such as components 340, 345 and 350, may reside in none, some, or all sections of a model. For example, plants 310 and 315 may share sample times with controllers 320 and 325, such as sample times of 0.01 sec and 0.001 sec. The sample times between plants 310/315 and controller 320/325 may match even though identifiers differ in appearance. For example, plants 310/315 include fast 1 identifier 340 and controllers 320/325 include fast 2 identifier 345 even though both identifiers represent a sample time of 0.001 sec. The different identifiers may be selected to represent distinct concurrent computing resources on which respective portions of model 300 will be run.

Model 300 may include eleven sub graphs (i.e., one for each identifier 335, 340, 345, 350 in each subgraph). In model 300, the sub graphs may be generated based on an assumption that the different sub graphs can be run concurrently. In an embodiment, the assumption may account for communication between the sub graphs within a component while the model executes. For example, an embodiment may assume that communications between sub graphs are protected by rate transition blocks or other mechanisms.

FIG. 3 includes Task Group 330, which can be shown as a legend-like object on a model canvas. Task group 330 can identify a group of tasks used with model 300. For example, task group 330 can include four distinct tasks. The four tasks may be configured to run on a computer having four cores, to run on four units of execution, or to run in another environment that supports four degrees of parallelism.

In task group 330, a first task is marked as corresponding to the continuous-time section of the model and is represented using identifier 335. A task corresponding to identifier 335 and representing the continuous-time section may ultimately contain a numerical solver that solves the underlying differential equations. When an implementation is configured to solve equations in real-time, model 300 may utilize a class of solvers known as fixed step solvers. Fixed step solvers can produce solutions of the set of differential equations at fixed time steps and can be mapped to tasks that have a fixed execution period. In model 300, the fixed step solver has a period of 0.0001 sec and is indicated in parenthesis in task group 330.

In contrast to the continuous task of task group 330, the remaining three tasks are discrete task and are marked as having execution periods of 0.01, 0.001, and 0.001 sec using identifiers 350, 345, and 340, respectively. This nomenclature implies that there are two compute elements that execute concurrently at the same rate of 0.001 sec, namely those associated with identifier 345 and 350.

Exemplary Setup of Computational Elements

Exemplary embodiments may allow users to enter information related to tasks via user interfaces. In an embodiment, a user may select an element of FIG. 3 by double clicking on the element. In response to the selecting operation, a user interface may open and may be displayed to the user via a display device. In another embodiment, a user may make a selection from a drop down menu to access the user interface. In still other embodiments, other techniques may be used to launch and access user interfaces, such as speech, touch sensitive input devices, textual interfaces (e.g., a command line interface), etc.

FIG. 4 illustrates user interface (UI) 400 that allows users to interact with model partitions. UI 400 can include task buttons 405, color field 410, name field 415, period field 420, priority field 425, core affinity field 430, and action buttons 435.

Task buttons 405 allow a user to create or delete tasks. In an embodiment, selecting insert task may insert a row for a task and selecting delete task may delete a row for a task. UI 400 may include an arrangement of information in which each row corresponds to a task, such as a continuous task which is indicated using identifier 335. Tasks can be described using characteristics or parameters, such as color, name, execution period, priority, and/or core affinity. Other embodiments can include additional or fewer characteristics and/or parameters depending on user preferences, specific parallel platform(s), etc. Still further, other embodiments can employ application programming interfaces (APIs) which may allows users to script the entry of task information into computer 110.

Color field 410 may indicate colors used to represent identifiers that reference units into which a model is broken. For example, color field 410 may identify colors used to identify sub graphs making up model 300. The continuous sub graph may be a first color, the fast sample time sub graphs may be a second color, and the slow sample time may be a third color. In another embodiment, the fast sample time sub graphs may be different colors. Other embodiments may further use shading or other techniques for identifying sub graphs or sub graph identifiers.

Name field 415 may include information identifying a sub graph in model 300. Period identifier 420 may include information identifying sample periods, or sample times, for sub graphs in model 300. Priority identifier 425 may include information identifying an execution priority for a sub graph in model 300, a concurrent computing resource, etc. Core affinity identifier 430 may identify a processing core, a processing device, a thread, a task, etc., on which a sub graph is run. Action buttons 435 may provide a user with access to commonly used functionality such as saving selections, canceling selections, accessing help resources, and applying changes to concurrent computing resources, model 300, etc.

Exemplary Mapping Technique

Embodiments allow users to identify sub graphs that are unmapped with respect to tasks residing in task group 330. For example, in FIG. 3, all sub graphs include a fill color, shading, or other type of visual identifier that indicates that the respective sub graph is mapped to a task in task group 330. Embodiments may not fill/shade a sub graph identifier until the sub graph identifier is mapped to a task. This approach may allow users to quickly identify sub graphs that are unmapped and therefore will not execute on a current computing resource when a model is simulated.

Figure 5:
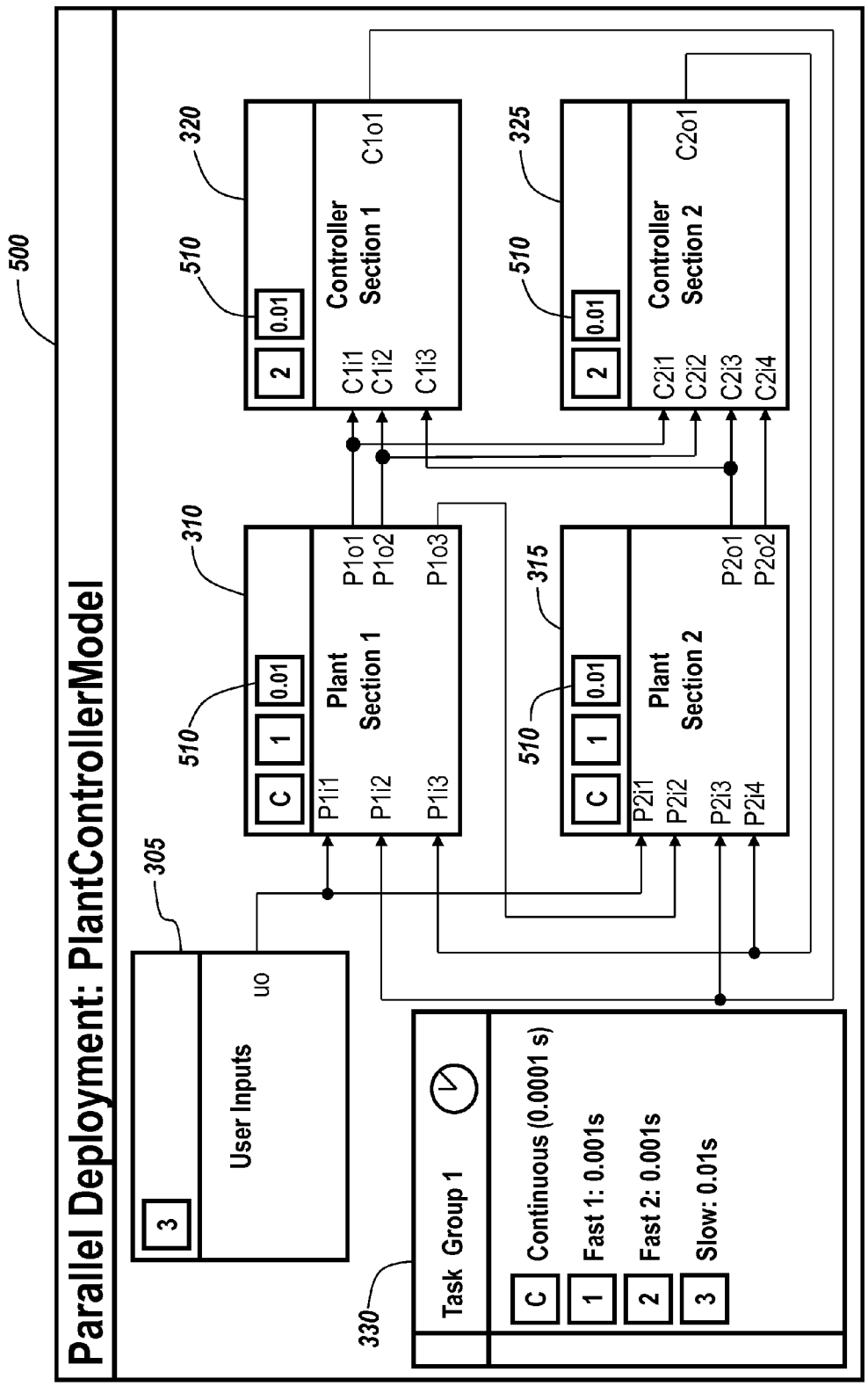
FIG. 5 illustrates a model that includes unmapped sub graphs.

FIG. 5 illustrates an exemplary model that includes unmapped sub graphs. Model 500 may include the model components of FIG. 3; however, in FIG. 5 sub graphs having a sample time of 0.01 sec are unmapped with respect to one or more tasks in task group 330. For example, sub graph identifier 510 may display the sample time for the sub graph and may include a region, such as a square, that visually differs from regions for mapped sub graphs. For example, identifier 510 may be unshaded where other sub graph identifiers are shaded. Alternatively, identifier 510 may be a color that differs from colors of mapped sub graphs.

In an embodiment, sample time identifiers, such as numbers, may be displayed for a sub graph identifier when the identifier is unmapped with respect to a task. When the respective sub graph is mapped, the sample time identifier may be replaced with a color, a shading pattern, or some other type of visual identifier that indicates the sub graph has been mapped to a task. Mapping a sub graph to a task may ensure that the sub graph is allocated to a concurrent computing resource when model 500 is simulated.

Embodiments may employ mapping techniques that enforce desired constraints. For example, a mapping tool may prevent mapping of sub graphs whose sample times do not exactly match the rate of execution of the task. Alternately, the mapping may allow mapping of sub graphs with a different rate as long as the sample time of the mapped sub graph is a multiple of the task execution period.

Figure 6:
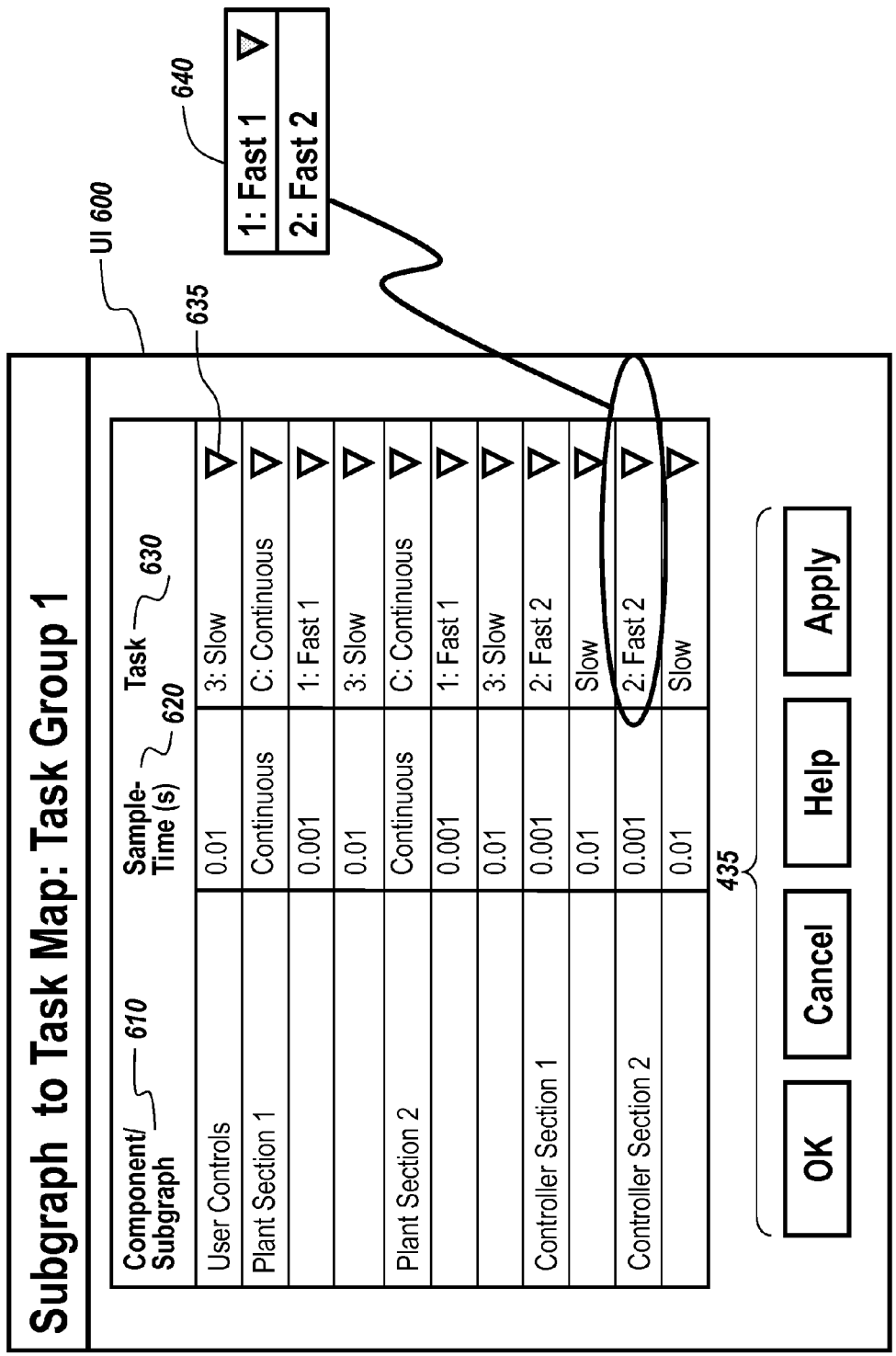
FIG. 6 illustrates a user interface for mapping sub graphs to tasks.

FIG. 6 illustrates an exemplary user interface for mapping sub graphs to tasks. While the embodiment of FIG. 6 illustrates a UI, the arrangement of information in FIG. 6 can represent information in a computer-readable storage medium, such as a data store, an API, etc., without departing from the spirit of the invention. UI 600 may contain a table that includes a listing of sub graphs in the first column, which is identified via component/sub graph identifier 610. The second column of UI 600 is indicated using sample time identifier 620. Sample time identifier 620 indicates a sample time for a corresponding sub graph or component. The third column of UI 600 includes task identifier 630 for identifying tasks associated with sub graphs. The third column may include drop down menus that can be indicated using drop down identifier 635. Drop down identifier 635 may allow a user to select which task a sub graph is mapped to. Drop down menus may provide the user with an intuitive and easy to use mechanism for selecting available tasks and for graphically associating tasks with sub graphs. An exemplary drop down menu 640 is shown in the upper right portion of FIG. 6 and may include names for available tasks.

FIG. 7 illustrates an exemplary user interface 700 for mapping sub graphs to tasks and/or cores. UI 700 may be based on UI 400 and may include mapped sub graph field 710 and move field 720. Mapped sub graph field 710 may include textual explanations about model components included in a mapped sub graph. For example, text can indicate whether a mapped sub graph is part of a plant, a controller, a user input/control, etc. The text can further describe sample rate information as well as other information related to a sub graph.

Move field 720 may include information that indicates a task on which a sub graph will run. In an embodiment, drop down menus may provide a user with available selections about tasks and/or whether a sub graph will be executed in a batch mode. Initially, move field 720 may be unpopulated and a user may manually populate entries in field 720. In another embodiment, entries in field 720 may be programmatically populated with initial configurations and a user may vary the configurations when desired. UI 700 may include a batch move button 730 that allows the user to move sub graphs associated with a batch mode as a group.

By way of example and referring to FIG. 7, sub graphs mapped to a respective task are listed in a separate column with the name of a component and sample-time. Additionally, unmapped sub graphs are shown as being associated with a special "unmapped" task. Field 720 may include fields having a pull down menu with task names that allow users to pick which task a specific sub graph should be moved into. For example, sub graphs 'User Controls (0.01)', 'Plant Section 2 (0.01)', 'Controller Section 2 (0.001)' are being setup to move to tasks 'Slow', 'Fast 1', and 'Fast 2', respectively. Field 720 may further allow users to remap sub graphs from one task to another. In an embodiment, UI 700 may be configured in a manner such that only tasks suitable for receiving items are presented in the 'Move to task' pull down menu. For instance, the pull down may only show tasks having a same period that matches a sample period of a corresponding sub graph. In FIGS. 6 and 7, sub graphs are indicated using textual names associated with the icons of the respective components.

FIG. 8 illustrates UI 800 that can use icons 810 for identifying sub graphs or components corresponding to sub graphs. UI 800 may use the icons in place of using textual descriptions. Users may drag icons 810 directly from one task to another to graphically perform mapping operations. Embodiments, such as UI 800, may prevent users from having to learn special configuration commands for mapping sub graphs to tasks. Instead, users can intuitively move objects, such as icons 810, from one location to another to achieve a desired mapping.

Figure 9:
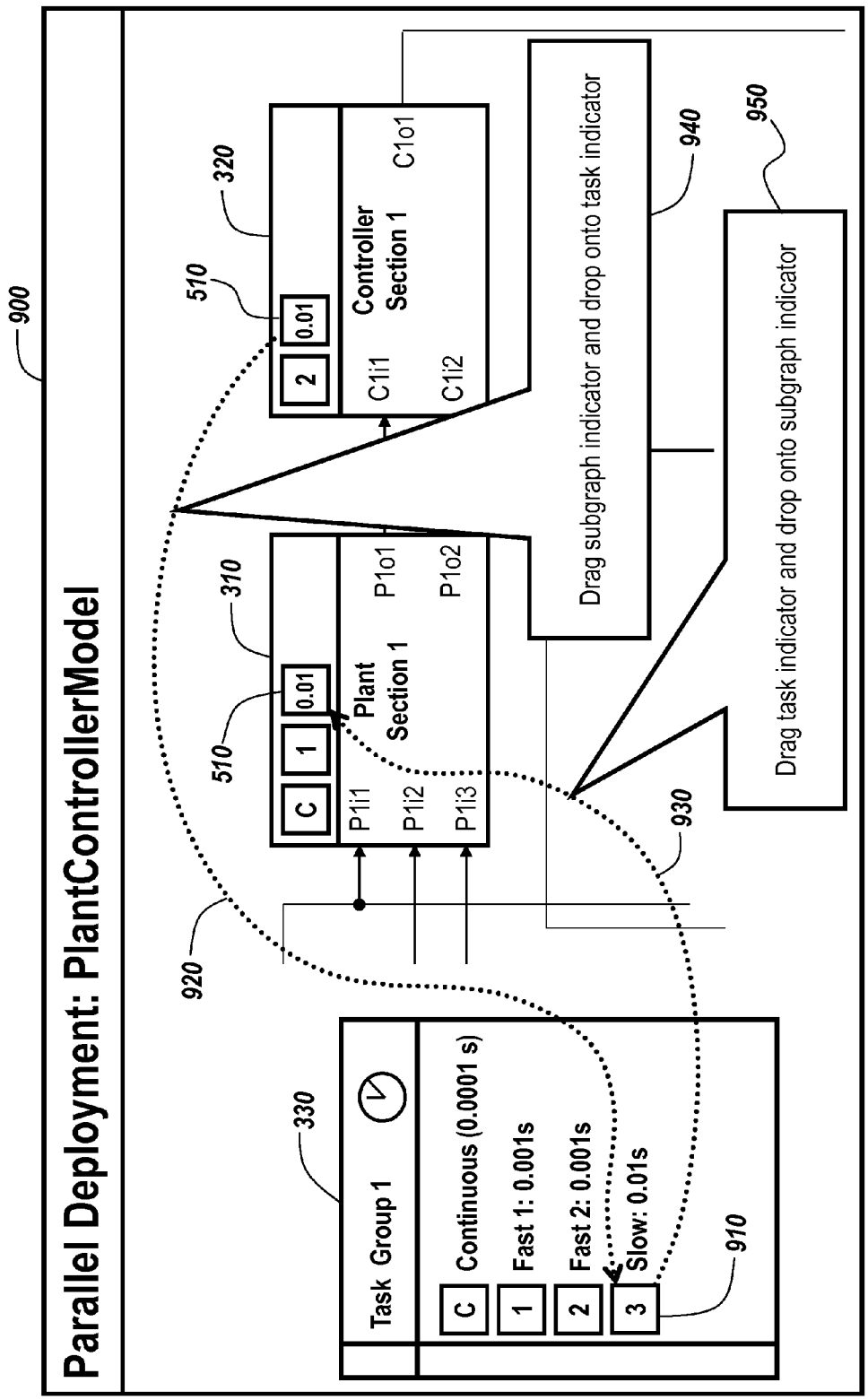
FIG. 9 illustrates a model configured to support drag and drop operations for mapping sub graphs or tasks.

Exemplary embodiments may allow users to specify mapping arrangements directly on a block diagram model. FIG. 9 illustrates model 900 which can be configured to allow a user to map sub graphs to tasks by selecting a sub graph and dragging the sub graph to a location in task group 330. A user may select sub graph identifier 510 using a pointing device and may drag identifier 510 along path 920. The user may drop identifier 510 proximate to task identifier 910 and identifier 510 may change appearance to resemble task identifier 910. The change in appearance of identifier 510 may indicate that the sub graph having an execution period of 0.01 sec is mapped to a task having an execution period of 0.01 sec.

A user may also select task identifier 910 and may drag identifier 910 along path 930 and may drop identifier 910 proximate to unmapped identifier 510 in component 310. Identifier 510 may change appearance after the drag/drop operation to resemble task identifier 910. The resemblance may indicate that identifier 510 of component 310 is mapped to task identifier 910. The embodiments of FIG. 9 may include help windows 940 and 950 that can provide a user with information or instructions regarding an operation to be performed or with respect to an operation that has been performed. In an embodiment, paths 920 and 930 may remain displayed on UI 900 and help windows 940 and 950 may be accessed by hovering a cursor for a pointing device over one of the displayed paths. UI 900 may provide an error indication when a user performs an unauthorized operation, such as attempting to mis-associate a task with a sub graph.

In an embodiment, user interface 700 may be built on top of a 'get_param' API of a graphical modeling environment, such as Simulink environment. In an embodiment, the mapping may be expressed as: map=get_param(<block-diagram-name>, 'TaskMappingTable'). When a table exists, the map may appear as an object that behaves like an object implemented using, for example, the MATLAB object-oriented class system. In an embodiment, a user may assign a component's sub graph specified by, for example, (component-name, sample-time) to a task specified by its name, which may be: map.mapSub graphToTask(<Component-name>, <sub graph-sample-time>, <task-name>). A programmatic API, such as API 1000 (FIG. 10A), may allow users to script the entire mapping process and/or to explore a design space iteratively. This interactive mapping can include performing a mapping, executing the design, gathering performance data, adjusting the mapping based on the performance data, and then refining the mapping for a subsequent iteration.

Exemplary Communication Between Tasks

Figure 10B:
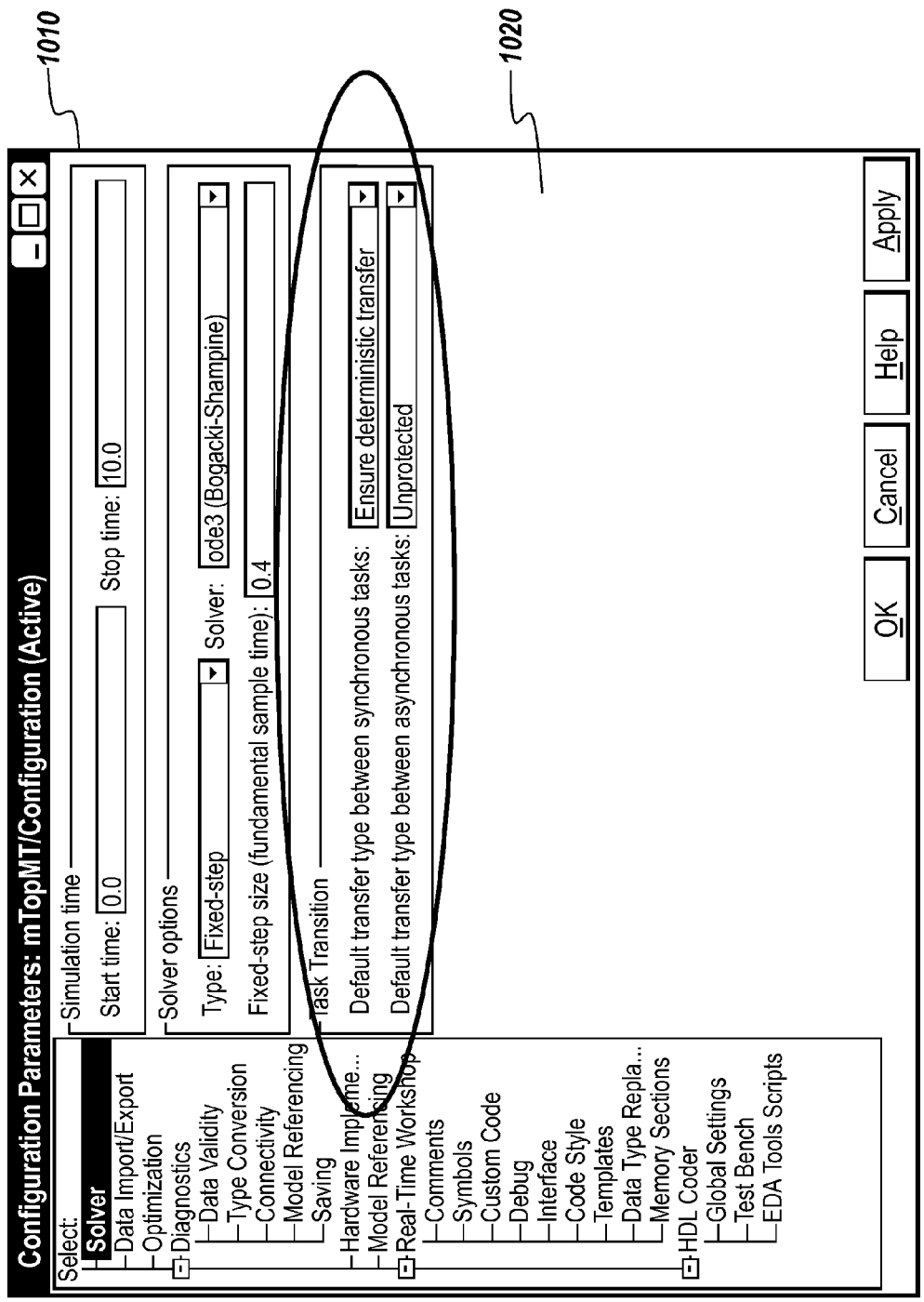

FIGS. 10A and 10B illustrate an exemplary technique of configuring communication between tasks. FIG. 10A illustrates user interface 1000 that can be used in an embodiment of the invention. User interface 1000 may include signal name field 1002 for allowing a user to specify information related to a signal in a model. User interface 1000 may further include tabs 1006 that identify panes into which information can be entered or specified, such as by using drop down menus. In an embodiment, one tab may be active, such as task transition property, in FIG. 10A and other tabs may be inactive. Active tabs may be in the foreground of a user interface and inactive tabs may be in the background.

The task transition property tab may include an entry for specifying a task transition type 1004. In an embodiment, a drop down menu may include acceptable selections for task transition type 1004. When a user is satisfied with a configuration of user interface 1000, the user may select OK via buttons 435.

When sub graphs have been mapped to tasks, signals in the model may satisfy two use cases when the model is executed. A first use case may occur when the signal facilitates communication between sub graphs that are mapped to the same task. A second use case may occur when a signal facilitates communication between sub graphs that are mapped to separate tasks. In the first case, communication may behave as a regular signal in a time-based block-diagram. In the second case, users may want flexibility to change between different forms of communication based upon the requirements of a design. Embodiments allow a model canvas to provide the ability for a user to specify communication modes for signals using both graphical user-interface methods and a programmatic API.

By way of example, a user can select a signal that represents the second case, above, and may be presented with a specified UI dialog 1010 shown in FIG. 10B. Dialog 1010 provides users with the ability to default to options including, but not limited to:

(a) a global override—which is setup once for the entire block-diagram as shown in FIG. 10B via pane 1020,
(b) ensure deterministic transfer (no delay)—which implies that a sub graph reading data will wait for the sub graph writing the data to complete its computation of the data,
(c) ensure deterministic transfer (delay)—which for concurrently executing tasks implies a delay of one execution period,
(d) ensure data integrity only—which implies the sub graph writing the data and the sub graph reading the data will simply ensure that the write or read is an atomic operation, and
(e) unprotected—which means reader and writer simply read and write to the same location with no protection of any kind.

Other embodiments can allow a user to access the functionality indicated in (a)-(e) above using APIs if desired. For example, when using the Simulink environment, a user may use a programmatic API such as set_param to a property that is displayed in dialog 1010. With respect to (a) global overrides, dialog 1010 allows a user to specify global override settings for all task communication in a model. Allowing use of a global override may prevent users from having to click on each signal and then individually configure the signals. Embodiments may allow users to specify global settings for communication between tasks from different task groups, and communication between tasks of the same task group, as shown in FIG. 10B.

Figure 11:
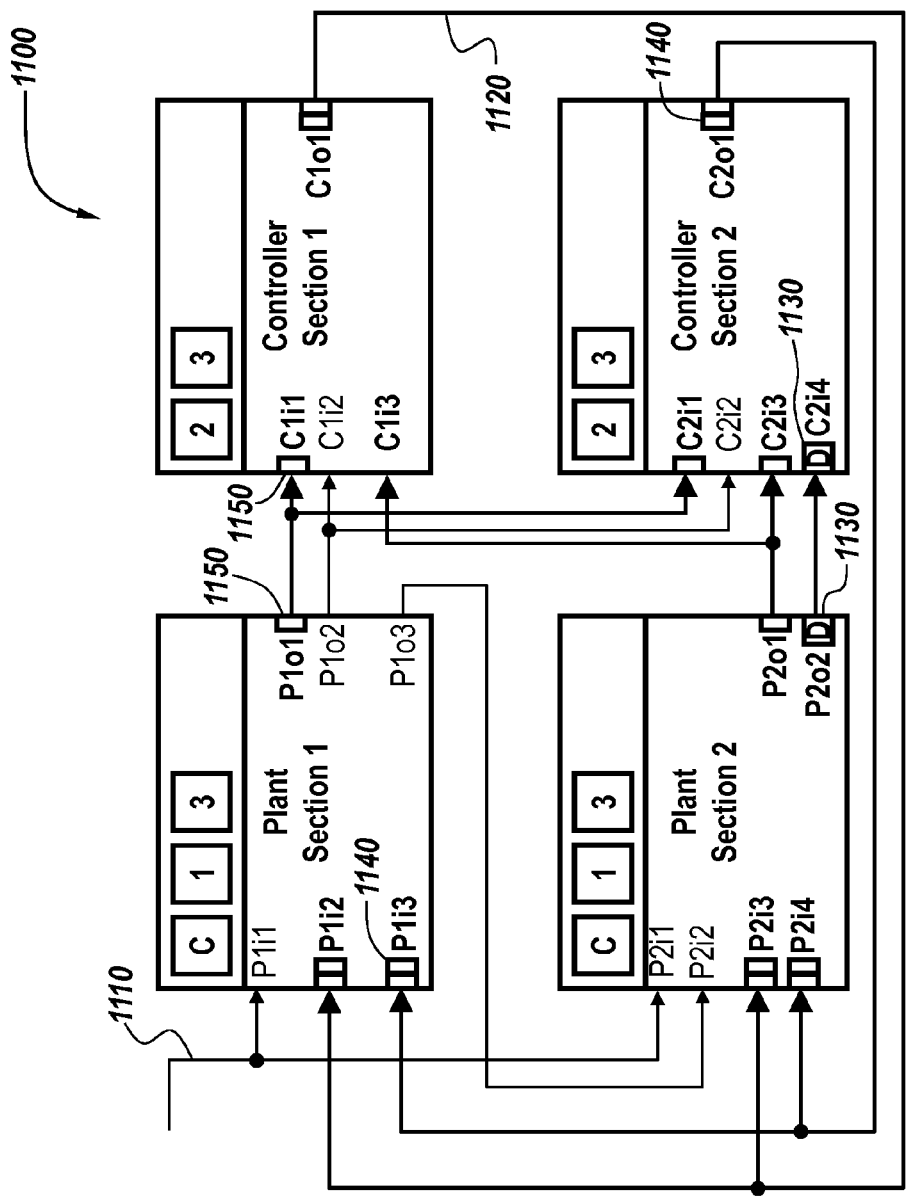
FIG. 11 illustrates a model having graphical elements that identify communication modes.

Embodiments may support the use of special markup graphical elements that help users visualize specific communication modes of the signals in a model. FIG. 11 illustrates an embodiment that makes use of graphical elements for helping a user understand signal communication modes in a model. In model 1100, line styles are used to indicate whether sub graphs mapped to the same task share communication or whether sub graphs mapped to different tasks share communication. Line style 1110 indicates the condition where two sub graphs communicate and are mapped to a single task.

Line style 1120 indicates the condition where two sub graphs communicate and are mapped to separate tasks.

Model 1100 may further include techniques for indicating other communication aspects. For example, model 1100 can include graphical identifiers that indicate communication modes (b)-(d) described above (page 23). Model 1100 may include the identifiers on reading communication ports or writing communication ports. Identifier 1130 can indicate case (b), and the identifier can include textual identifiers such as "D" residing within the graphical identifier. Case (c) can be indicated using identifier 1140. This identifier may include two shapes abutting each other. Case (d) may be indicated using identifier 1150 and may include a single rectangular identifier.

Communication modes (b) through (d) described above are shown using special markings on the respective writing and reading communication ports. Case (a) can map to one of the other cases, (b)-(d) on the basis of the setting of the global override and mode, and case (e) is may be a degenerate case and is not further discussed herein.

Embodiments may allow users to inspect models once sub graph to task mappings have been performed. The use of a task color, shading, fill pattern, etc., in a sub graph that is mapped to the task may inform a user about the relationship. For example, this technique may show the user how a block-diagram is segmented across a concurrent computing resource. This is illustrated in FIG. 1 where there are only 4 colors in the entire canvas. Embodiments allow users to visualize exactly how the diagram is divided across the tasks.

Exemplary Visualization Affordances

Figure 12A:
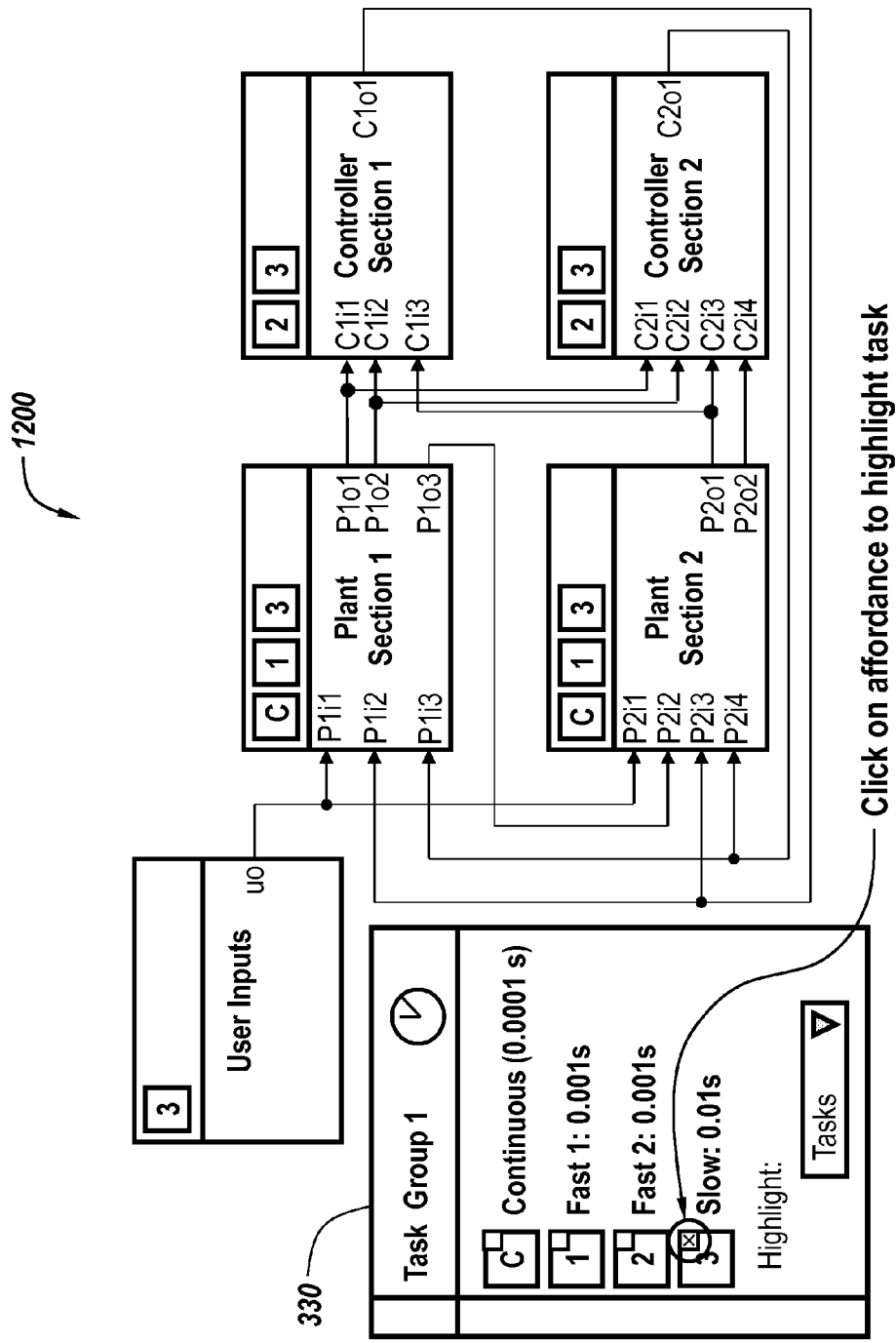
FIG. 12A illustrates a model that includes visual affordances for determining a mapping.

Embodiments may also allow a user to interact with model components to identify sub graphs mapped to a specific task. FIG. 12A illustrates a model that allows a user to select an affordance to determine which sub graphs are mapped to a task. In model 1200, a user may select identifier 1210 in task group 330. In FIG. 12A, identifier 1210 may include an affordance 1220 that can be toggled between an OFF state and an ON state. An ON state for affordance 1220 may include displaying an "X" within the affordance to indicate a selection.

Figure 12B:
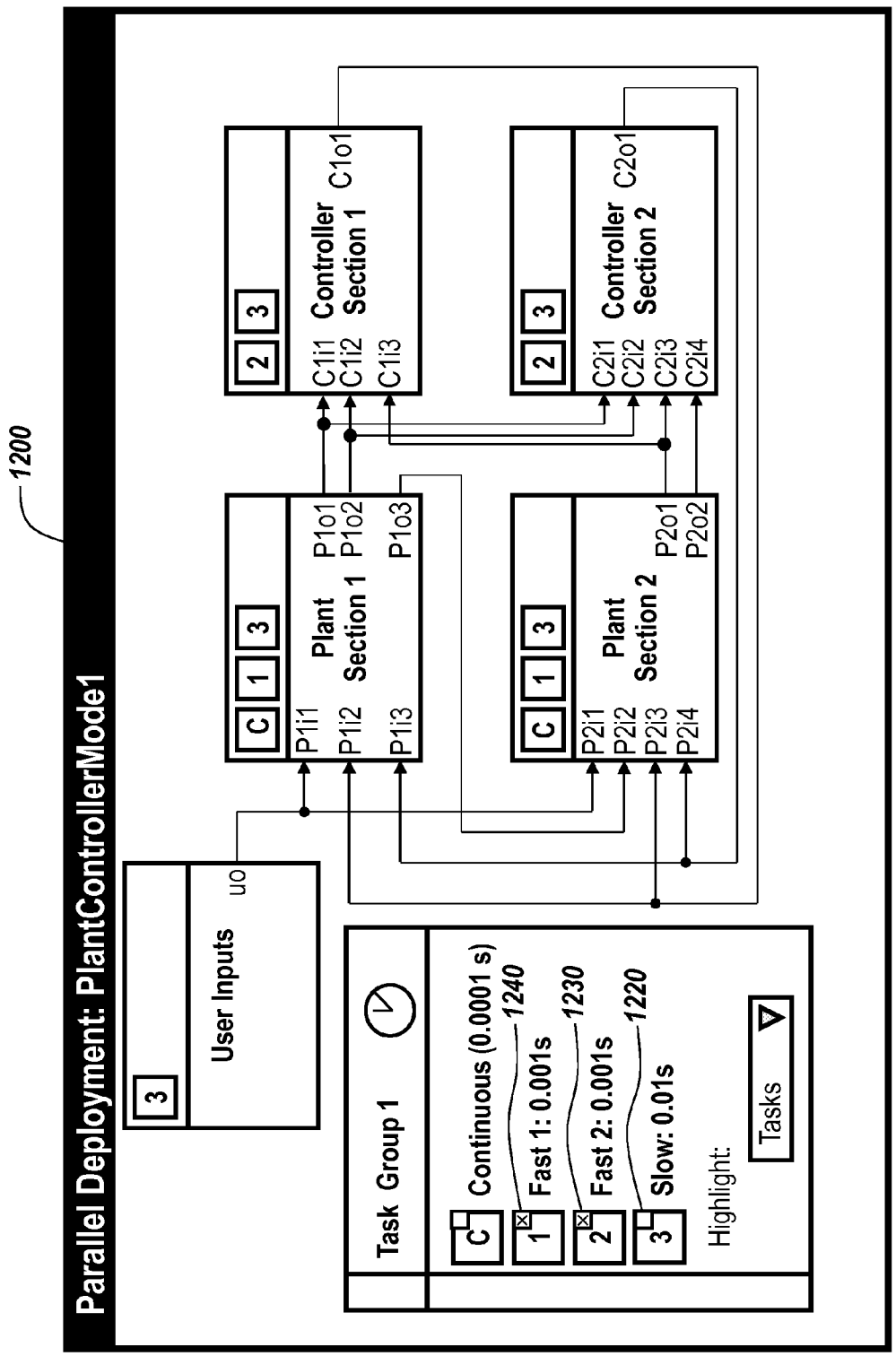
FIG. 12B illustrates a model that includes highlighting to identify sub graphs sharing characteristics.

When affordance 1220 is selected, sub graphs mapped to the selected task may be indicated to the user. For example, sub graphs may be shaded with a color that is substantially identical to a color of identifier 1210. Model components that include respective sub graphs may be colored, shaded, or otherwise manipulated to indicate that a sub graph within the component is mapped to a task. Embodiments may allow a user to highlight sub graphs that execute at a specific period by using multiple selections of tasks as illustrated in FIG. 12B. For example, a user can select affordance 1230 and 1240 and sub graphs associated with the respective tasks may be highlighted or identified using other techniques.

Figure 13:
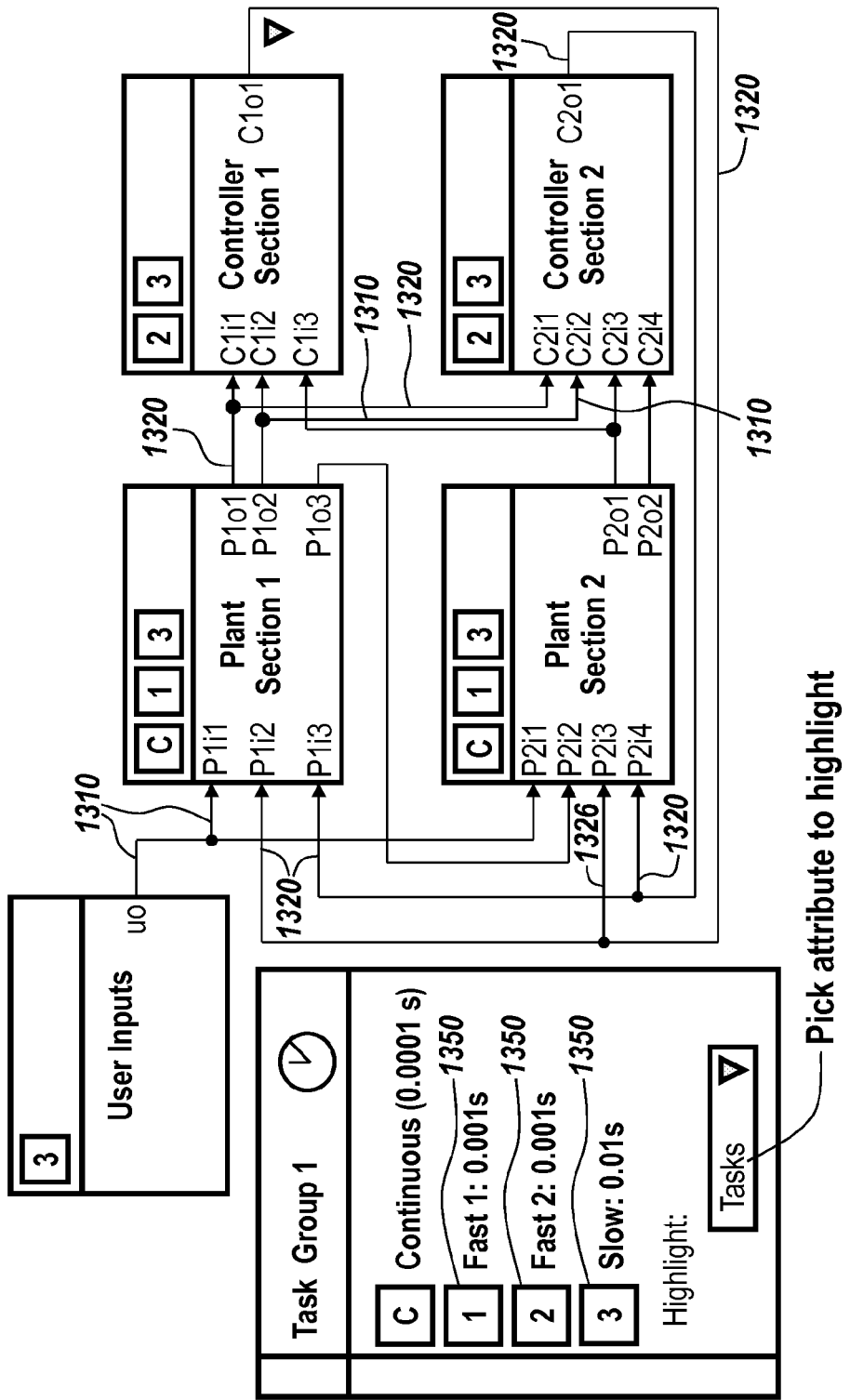
FIG. 13 illustrates techniques for identifying task execution periods.

A model, or block-diagram, canvas can also be used to visualize different properties corresponding to tasks or sub graphs that are overlaid on the canvas. FIG. 13 illustrates a model that uses visual techniques to identify task execution periods. For example, identifier 1340 for task 3 may be a first color, such as blue. Lines going to an input port or an output port of a component having a sub graph associated with task 3 may be the same color as the shading for task 3, namely blue.

In FIG. 13, lines 1310 may be colored blue to correspond with the coloring of task 3 identifier 1340. Lines associated with other tasks may be displayed in colors that differ from the color of lines 1310. For example, lines associated with tasks having a period of 0.001 sec may be colored red and may be indicated by lines 1320. Tasks 1 and 2 may have a period of 0.001 sec and may also be red. In FIG. 13, task 1 identifier 1350 and task 2 identifier 1350 may be red to allow a user to determine that lines 1320 go with task 1 and task 2.

Embodiments may also allow core affinities, task priorities, and other types of task or sub graph characteristics to be indicated using colors. Embodiments may further employ color overlays to identify combinations of information and/or other relationships. For example, an embodiment can overlay the task color and task execution period as two separate colors on each sub graph and/or task identifier to communicate multiple pieces/types of information to a user simultaneously. Other embodiments may use numbers, text, shading patterns, differing icons, etc., to, for example, handle situations where tasks may be too numerous to allow for visual contrast using colors, and/or to accommodate users having color blindness.

Exemplary Model Execution

Embodiments provide users with convenient interfaces and techniques for graphically mapping sub graphs to tasks and for specifying communication modes among the sub graphs and tasks. A model may be ready for simulation once the user has mapped sub graphs to tasks and addressed communication issues. For example, the user may execute the model using specified concurrent computing resources. A user may perform concurrent processing using a single device having multiple processing resources residing therein, or the user may employ separate concurrent computing resources that simultaneously perform operations to simulate the model.

Embodiments may allow models to be simulated in an interpretive fashion on a simulation platform that may be employed to build the model. For example, a simulation environment, such as the Simulink environment, may provide interpreted simulation capabilities. In this example, tasks specified in a task group may become specific compute elements such as a thread on a target platform. A thread may then execute sub graphs mapped to the thread using an interpretive mode. In this embodiment, threads may execute concurrently in accordance with specified parameters, such as priority and scheduling policies that might affect thread scheduling.

Embodiments may further generate code configured for execution on a specified concurrent computing resource, such as a parallel platform. For example, code may be generated for each task. In an embodiment, the code for a task can be generated as a thread on the target platform. Here, the threads may be part of an application that is compiled and executed on the parallel target.

Embodiments can be configured such that code generated for each sub graph mapped to a task that executes on a parallel target is the same as code generated for use on non-parallel targets. In this configuration, the specialization that supports parallel targets may consist of code for communication between sub graphs mapped to different tasks.

FIGS. 14A-D illustrate code examples for implementing the model of FIG. 3. For example, the code illustrated in FIGS. 14A-D may be generated from model 300 and may be configured for deployment on, for example, a multi-core Intel platform running a Linux operating system.

FIG. 14A illustrates the generation of four threads. In FIG. 14A, there is one thread per task. This configuration may comply with a portable operating system interface for UNIX (POSIX) standard on the target platform. In the embodiment of FIG. 14A, each thread may be explicitly scheduled to run by a base-rate thread that runs at the fastest rate of 0.0001 s and is setup as shown in FIG. 14B. The base rate task may be bound to a software interrupt that fires on the basis of a 0.0001 s timer as shown in FIG. 14B. The body of the base rate thread can also maintain counters that help post explicit semaphores at appropriate times for the one 0.0001 s, one 0.01 s and two 0.001 s threads bound to sub graphs, thereby scheduling the threads to execute. This configuration is illustrated in FIG. 14C.

By way of example, the base rate thread posts semaphores for the two 0.001 s threads every 10 times it runs (because 10×0.0001 s=0.001 s). In a Simulink environment, this can be performed by calling 'rtmStepTask' that determines whether a semaphore should be posted for the specific thread to run. Additionally, the base-rate thread calls the function 'AdvanceTaskCounters' which updates counters that help the base rate thread determine how the threads operating at different periods should execute.

In the embodiment of FIGS. 14A-D, the code for each thread executes the sub graphs that are mapped to that task. FIG. 14D illustrates code for each of the 4 threads. In the Simulink environment, sub graph functions that each thread calls can funnel into the function 'PlantControllerModel_step' shown in FIG. 15 via code portion 1510. The function of FIG. 15 may, in turn, dispatch to four separate step functions one of which is shown in the righthand portion of FIG. 15 via code portion 1520. The function of FIG. 15 includes calls to the individual sub graphs mapped to the thread. FIG. 15 does not illustrate code for the body of each sub graph to simplify presentation.

Code for the embodiments of FIGS. 14A-D and FIG. 15 may be produced using APIs that allow specific target platforms to produce desired code for tasks. These APIs can allow a custom parallel target to take functions generated by a code generating product, such as, for example, Real-Time Workshop, and produce threads illustrated in FIGS. 14A-D and FIG. 15.

Embodiments may use deployment diagram specific target language compiler (TLC) APIs to provide classes of information. For example, classes of information can include:
(1) the number of task groups and the major parameters of each task group,
(2) the number of tasks within each task group, and their respective parameters, and
(3) the specific sub graph-related functions that are mapped to each task.

An exemplary API can be based on the TLC language provided by the MathWorks and can include the following TLC functions to get the three classes of information identified above. For example, the following TLC function can be used:
1. LibParallelDeploymentGetNumTaskGroups( ): Returns the number of task groups in the block-diagram.
2. LibParallelDeploymentGetTaskGroup(taskGrpIdx): Returns a record (object) that gives the properties of the task group whose index is taskGrpIdx. This record will have fields such as 'IsConcurrent', 'InterruptSource', 'BaseTriggeringTime', etc.
3. LibParallelDeploymentGetNumTasks(taskGrpIdx): Returns number of tasks within the task group.
4. LibParallelDeploymentGetTask(taskGrpIdx, taskIdx): Returns record (object) that gives the properties of the task whose index is taskIdx within the task group whose index is taskGrpIdx. This record will have fields such as 'ExecutionPeriod', 'Priority', 'CoreAffinity' etc.
5. LibParallelDeploymentEmitTaskExecBody (taskGrpIdx, taskIdx): Emits the actual calls to the functions corresponding to the sub graphs that are mapped to task whose index is taskIdx within the task group whose index is taskGrpIdx.
6. LibParallelDeploymentEmitAdvanceTaskCounters( ) Emits the call to the function which computes which task need to run at the next time step. This function is responsible for emitting the call to 'AdvanceTaskCounters' shown in FIG. 14C.

APIs 1 through 6, above, may be reflections of information that users have entered on a canvas for sub graphs, task groups, tasks, task/sub graph mappings, etc. An exception can occur with API 5, above, which can emit the calls highlighted in FIGS. 14A-D within each thread. Embodiments may enable emitting these calls by having a block-diagram engine compile the diagram and determine the ordering of sub graph calls within the thread. This ordering is produced, for example, in the Simulink environment by using the direct feed through setting of individual signals connecting sub graphs across model components. For example, the direct feed through setting allows the block-diagram engine to sort the individual sub graphs in the order of their data dependencies. As an example, the body of function 'PlantControllerModel_step3' illustrated in FIG. 15 is generated by the API.

In addition to generating code for the appropriate compute elements such as threads, authors of custom targets can specify correct target-specific implementations for the communication modes between sub graphs on different tasks. The various communication modes are generally realized by using target-specific implementations of mutual exclusions (mutex) and semaphores.

FIG. 16A illustrates code examples that can be used to ensure 'deterministic transfer (no delay)' communication between two sub graphs having identical sample times when the sub graphs are mapped to different tasks with identical execution periods. The embodiment of FIG. 16A can be implemented using semaphores on an Intel target running the Linux operating system. The implementation of FIG. 16A uses semaphores on the read side to wait for the wait to complete at each execution step.

Similarly, FIG. 16B illustrates how communication of the form 'ensure data integrity only' between two sub graphs with identical sample times mapped to different tasks with the identical execution periods can be implemented using mutexes on an Intel target running the Linux operating system (using POSIX standard). The mutexes conceptually prevent a read of partially written information from happening when the write operation is in process. This embodiment can also prevent writing data when a read process is operating.

FIG. 16C illustrates a technique for realizing communication of the form 'ensure deterministic transfer (delay)' using a double buffer. In the embodiment of FIG. 16C, writer and reader sub graphs write and read from separate buffers at each time step. The specific buffer is then toggled after the read/write operations are complete.

Figure 17A:
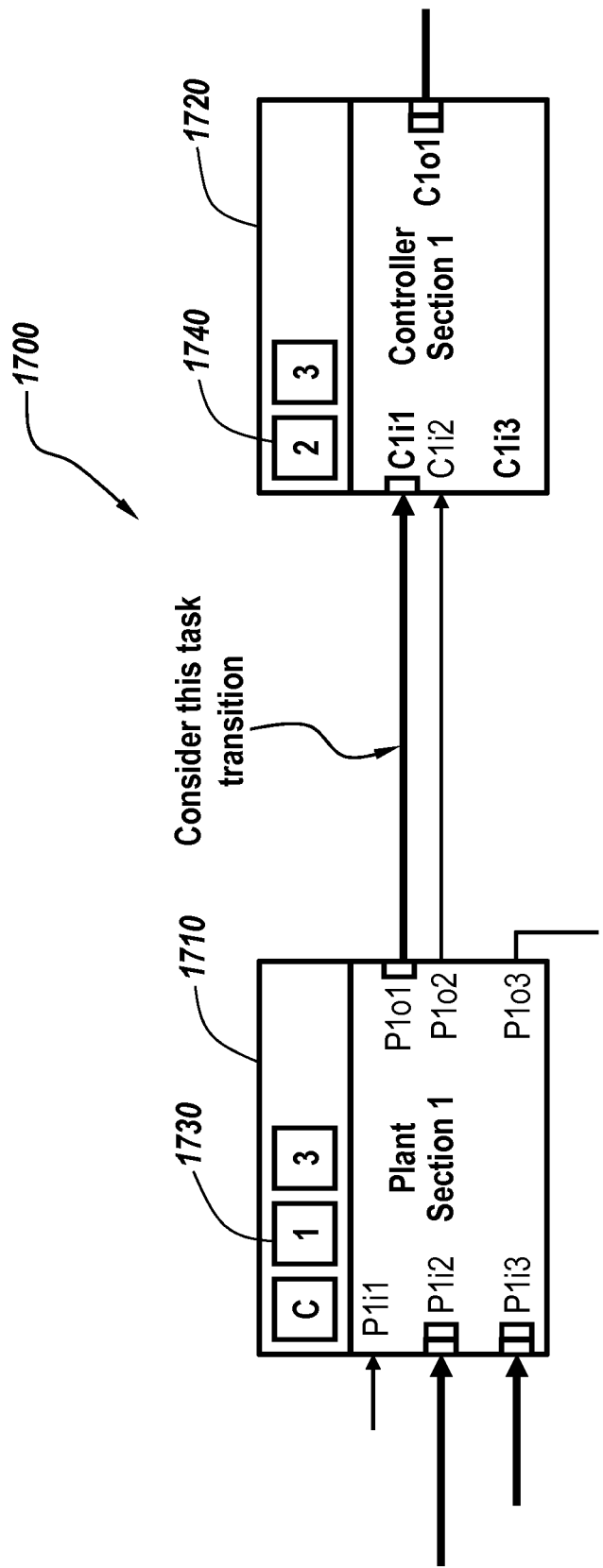
FIG. 17A illustrates an exemplary model for generating code.

FIG. 17A illustrates model 1700 that can be used to generate code appropriate for supporting a desired communication mode. Model 1700 may include two components 1710 and 1720 that include sub graphs 1730 and 1740 having identical sample times and that are mapped to separate tasks, namely task 1 and task 2, having identical execution periods. With respect to FIG. 17A, assume the communication requires that only data integrity is ensured. The embodiment of FIG. 17A may be configured to insert special blocks when model 1700 is compiled. For example, a compilation engine may insert the special blocks which are illustrated in FIG. 17B.

Figure 17B:
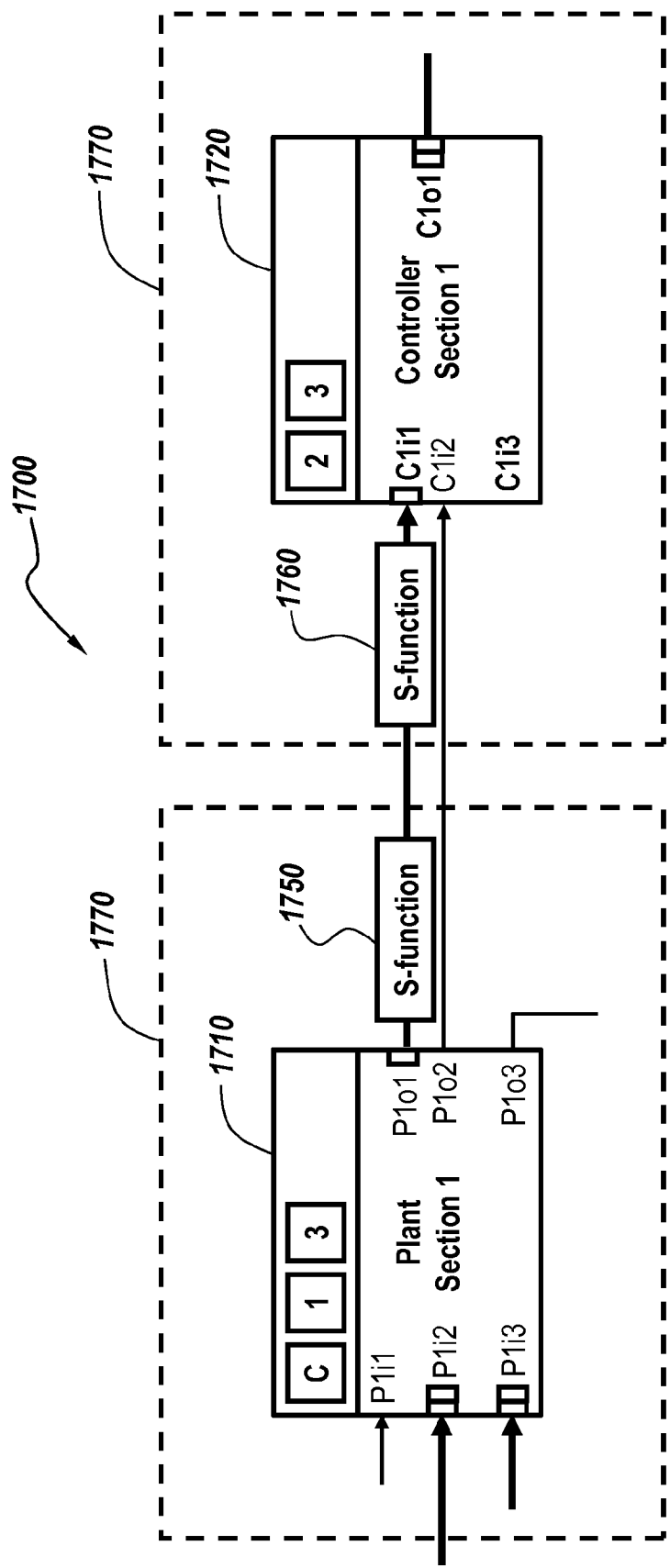
FIG. 17B illustrates a block that can be inserted into a model to ensure data integrity.

Referring to FIG. 17B, the blocks may be inserted on the write and read side, respectively, of communication lines between the sub graphs 1730 and 1740. In an embodiment, blocks 1750 and 1760 may be inserted into model 1700, and may be written using an S-function interface as provided in the Simulink environment. In FIG. 17B, the S-functions are further configured to have communication that ensures data integrity. For example, a user can implement an S-function by writing code of the form illustrated in FIG. 18A for the read and write side. Code portion 1810 includes the 'mdlOutputs' function of the S-function which performs the appropriate mutex operation based on whether the operation is writing or reading data.

Code portion 1810 can be used to derive a TLC implementation for the blocks. The TLC implementation may be provided via code portion 1820 of FIG. 18B. Code portion 1820 can be a file and the TLC file may ensure that appropriate mutex code of the form shown in FIG. 16B is emitted by a block during code generation. The example of FIGS. 17A and B and 18A and B dealt with a specific communication mode; however, other communication modes can be realized using the process discussed above or variations of the process discussed above without departing from the spirit of the invention.

Exemplary embodiments have been discussed in context of examples including a single task group within the deployment diagram. Concepts and examples discussed herein can be applied to implementations including multiple task groups within a diagram where each task group can have distinct properties with respect to other tasks in the diagram. For example, tasks can have differing interrupt sources that generate a trigger for underlying tasks, the scheduling policy of tasks, etc.

Figure 19:
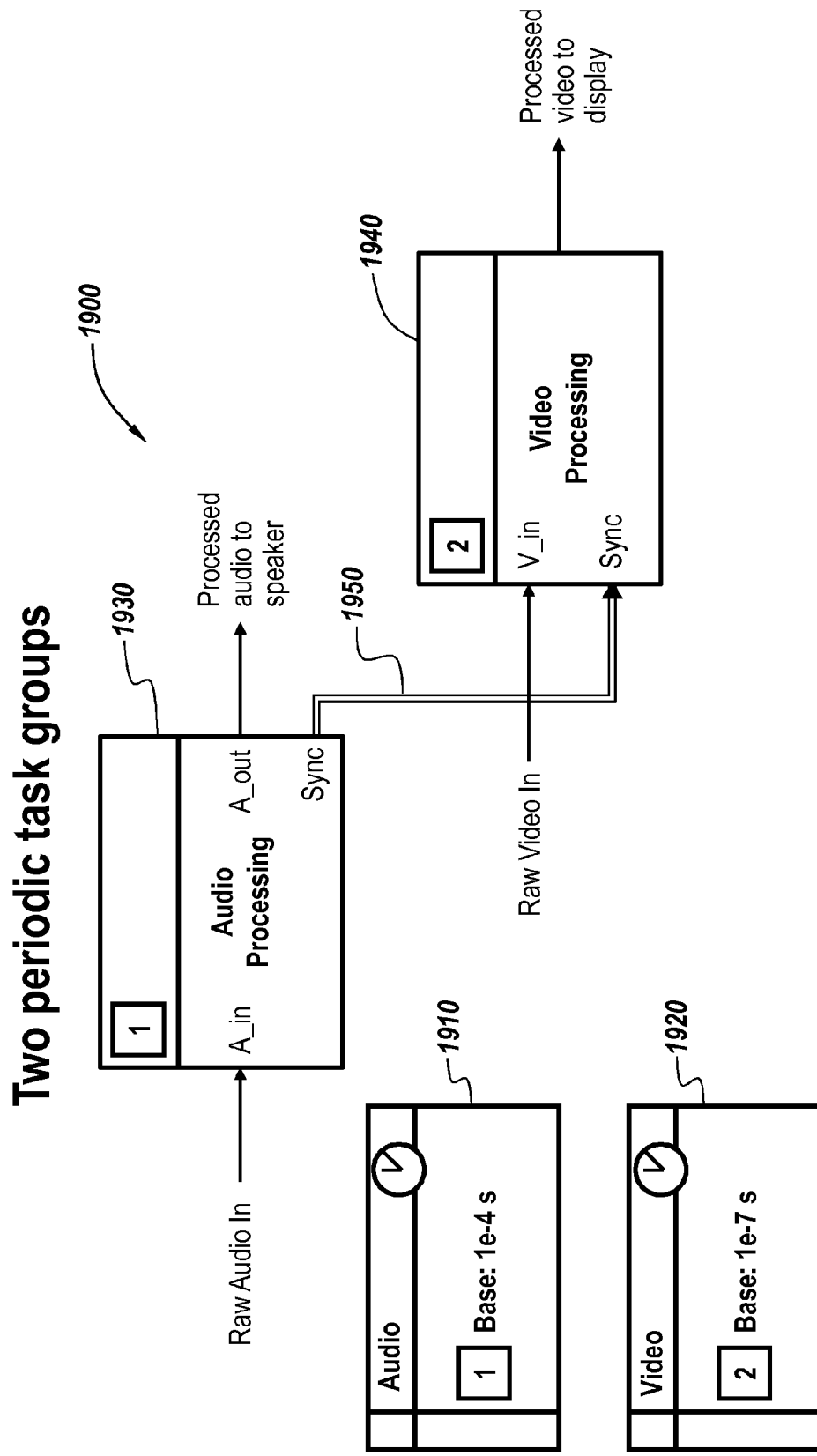
FIG. 19 illustrates an exemplary model having two task groups and a model that includes an interrupt timer.

FIG. 19 illustrates an example that includes a model 1900 having two task groups audio 1910 and video 1920. Audio task 1910 is executed by tying an interrupt to a timer with period 1e-4 s and video task 1920 is executed by tying an interrupt to timer having a period 1e-7. Modeling implementations as shown in FIG. 19 can be useful when a user is working with signals having disparate timing such as audio and video signals within a audio-video decoder. In FIG. 19, tasks may be mapped to components in model 1900. For example, audio task 1910 is mapped to audio processing component 1930 and video task 1920 is mapped to video processing component 1940. Model 1900 may further use line styles, e.g. double line 1950 to indicate types of communication between sub graphs in model 1900 that are mapped to tasks on separate task groups.

Figure 20A:
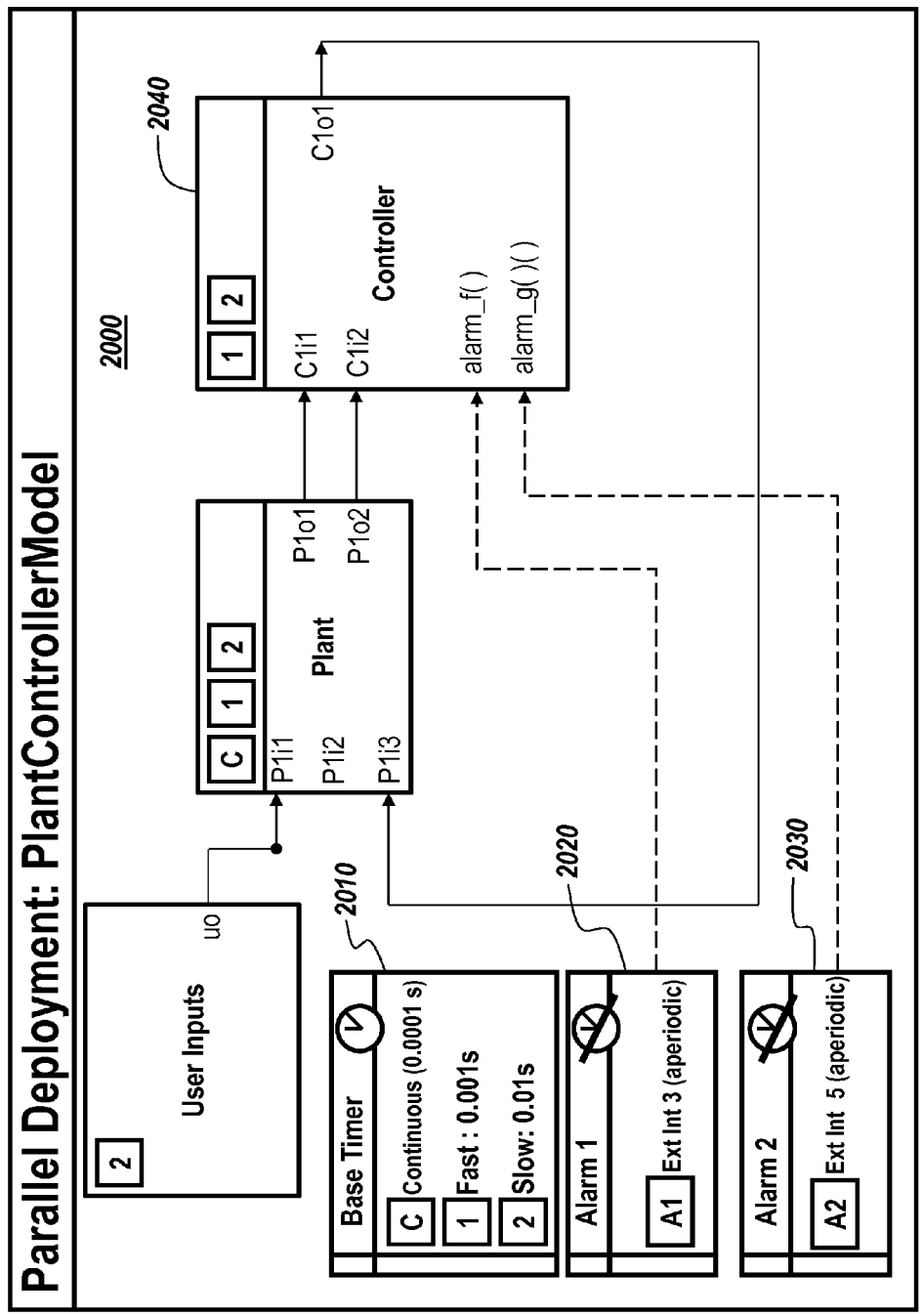
FIG. 20A illustrates an exemplary model for a periodic task.

FIG. 20A illustrates an embodiment configured for handling aperiodic tasks that are in a dedicated task group. FIG. 20A illustrates model 2000 that includes a task group identified as base timer 2010. Base timer 2010 includes periodic tasks whose execution is triggered by an interrupt from a timer. Model 2000 can further include a task group identified as alarm 1 2020 that can include an aperiodic task A1. Task A1 can be triggered by an aperiodic external interrupt. Model 2000 can also include a task group identified as alarm 2 2030. Alarm 2 2030 can include an aperiodic task A2 that can be triggered by a different aperiodic external interrupt. Model 2000 may use visual techniques to indicate that a corresponding aperiodic sub graph within in the block-diagram. For example, model 2000 can use function-call signals and/or subsystems as may be provided in a Simulink environment.

Model 2000 can include a component controller 2040 that can include two function-call signal inputs alarm_f( ) 2045 and alaram_g( ) 2050. In model 2000 input 2045 and input 2050 can be marked as function calls triggered in an aperiodic fashion. Controller 2040 can include a function-call subsystem that is an aperiodic sub graph. A user can map the aperiodic sub graphs to task groups explicitly by, for example, drawing unique identifier lines from task group blocks to the function-call inputs on the controller 2040 as illustrated in FIG. 20A. When model 2000 is executed interpretively or using generated code, a target-specific binding of respective sub graphs to compute elements, e.g., concurrent computing resources, can be performed as previously described in connection with a single task group.

Figure 20B:
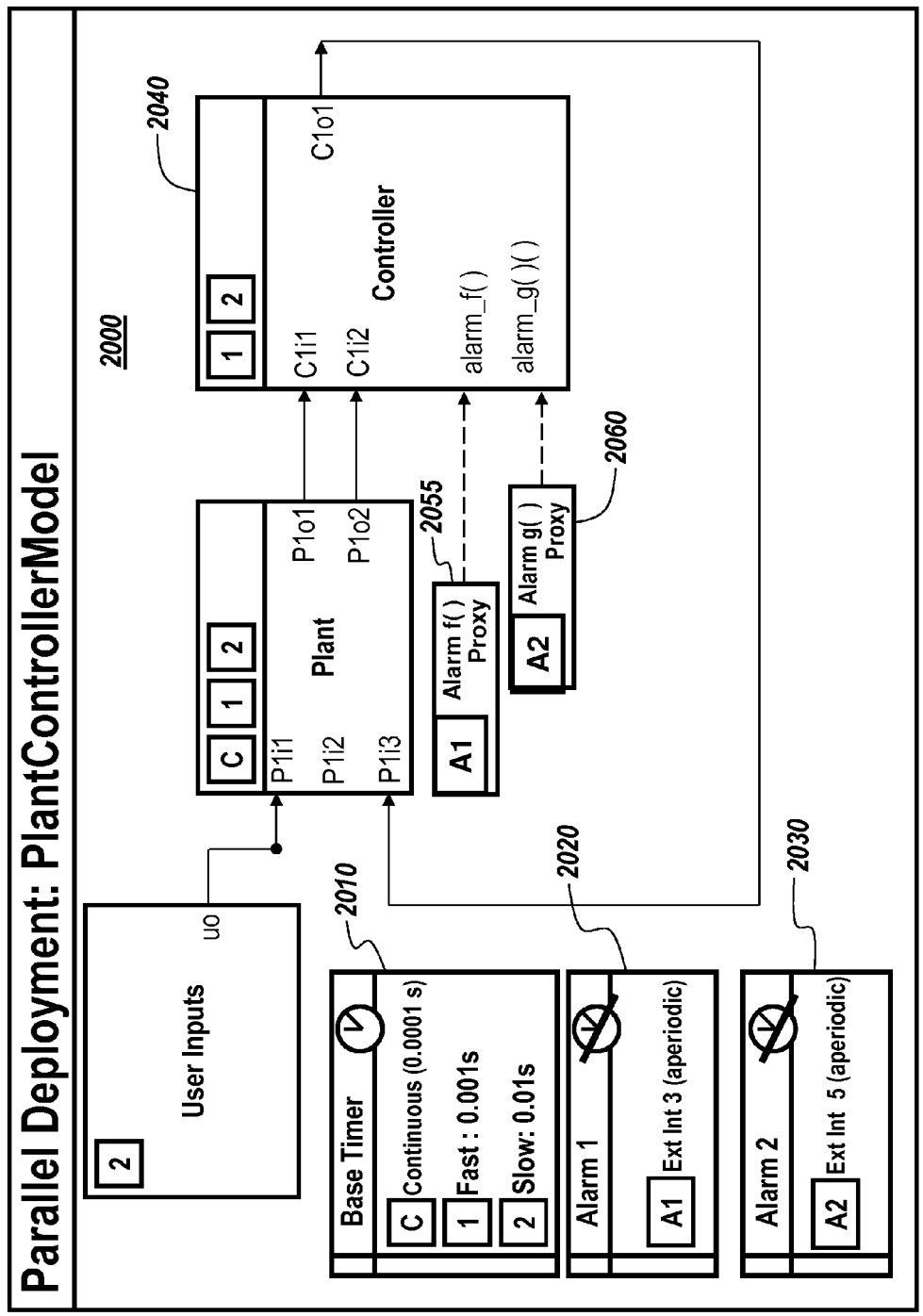
FIG. 20B illustrates an alternative implementation of the model of FIG. 20A.

FIG. 20B illustrates an alternative implementation of model 2000 in FIG. 20A. FIG. 20A included specific connections between an aperiodic sub graph and a task group. FIG. 20B illustrates an implementation that uses function-call inputs that are tied to sub graph proxy blocks 2055 and 2060, respectively. Proxy blocks 2055 and 2060 may acts as a stubs that allows mapping of the corresponding sub graphs to tasks using a data store (e.g., a table), programmatic API, etc.

FIG. 21 illustrates an exemplary data store 2100 for use with proxy blocks in a model. Embodiments can display the contents of data store 2100 using a UI to allow user interaction with fields in data store 2100. Data store 2100 may be associated with proxy 2055 and may include information related to alarm_f( ) and may include information for mapping the task group Alarm 1 2020 and alarm_g( ) 2050 to the task group Alarm 2 2030. The embodiment of FIG. 21 may allow users to easily manipulate mappings programmatically without having to explicitly move connections as was done in the embodiment illustrated in FIG. 20A.

In some implementations, a user may wish to target a model design to more than one target platform that employs concurrent computing resources. By way of example, a user may wish to explore mapping on both a 4-core platform and an 8-core platform to compare their performance in terms of speed, power consumption, cost, etc. Exemplary embodiments may allow the user to simultaneously compare different target platforms with respect to one or more models.

Figure 22:
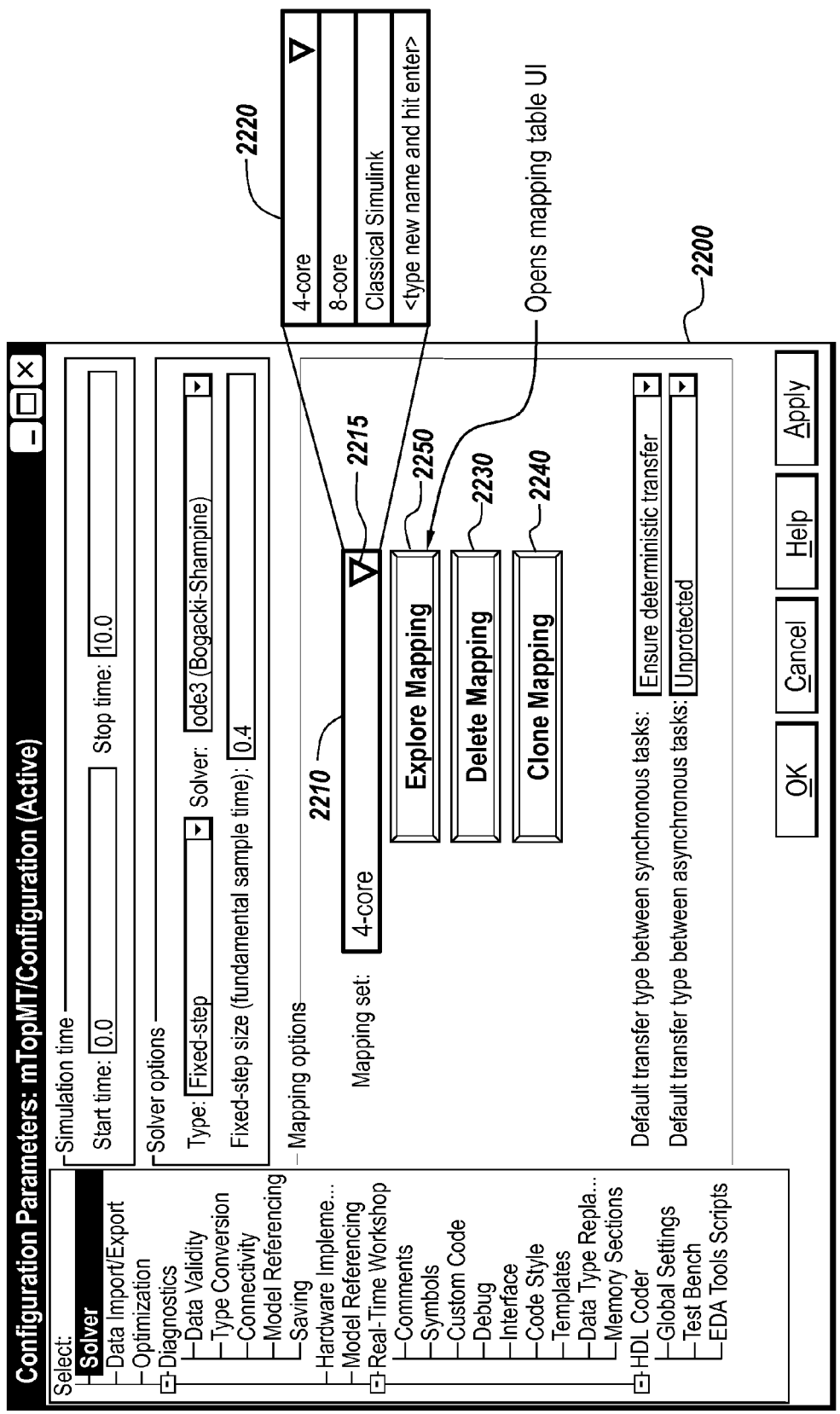
FIG. 22 illustrates an exemplary embodiment for interacting with target platforms.

FIG. 22 illustrates an implementation that allows a user to interact with multiple target platforms. The embodiment may provide UI 2200 to a user for allowing the user to specify multiple target platforms for a model. UI 2200 may include mapping set 2210 that can include a drop down menu that lists available concurrent computing resources. For example, the user can be presented with menu 2220 when the user clicks on icon 2215. Menu 2220 may allow the user to toggle between mappings using the mapping set parameter. The user may create a new mapping by typing the name of the mapping into UI 2200 by, for example, entering the text into a last entry in menu 2220. A user can delete a selected mapping by selecting delete mapping 2230. A mapping may be cloned by selecting clone mapping 2240. In addition, a user can modify a mapping by selecting explore mapping 2250.

In an embodiment, a user can create a new mapping and then toggle to the mapping. When this occurs, a model may default back to a single task group block having a default configuration. The user may perform a new mapping of sub graphs to tasks using techniques described herein. Embodiments may further allow the user to configure communication between sub graphs that pertain to the new mapping. When the user toggles to a different mapping, currently active mapping information (e.g., all task groups, their mapping to sub graphs, sub graph communication modes, etc.) is saved away and the task groups and corresponding mapping information may switch to the toggled mapping.

In certain situations a user may wish to solve differential equations using a solver when, for example, modeling a plant controller. The user may need to break the modeling problem into pieces and may need to operate on the pieces simultaneously to obtain solutions of the equations within a determined time interval. Each piece may be a compute element that is operated on to produce a solution. Embodiments may assist the user with solving pieces of a model simultaneously by introducing some approximations into communication between the compute elements running the solver.

Figure 23A:
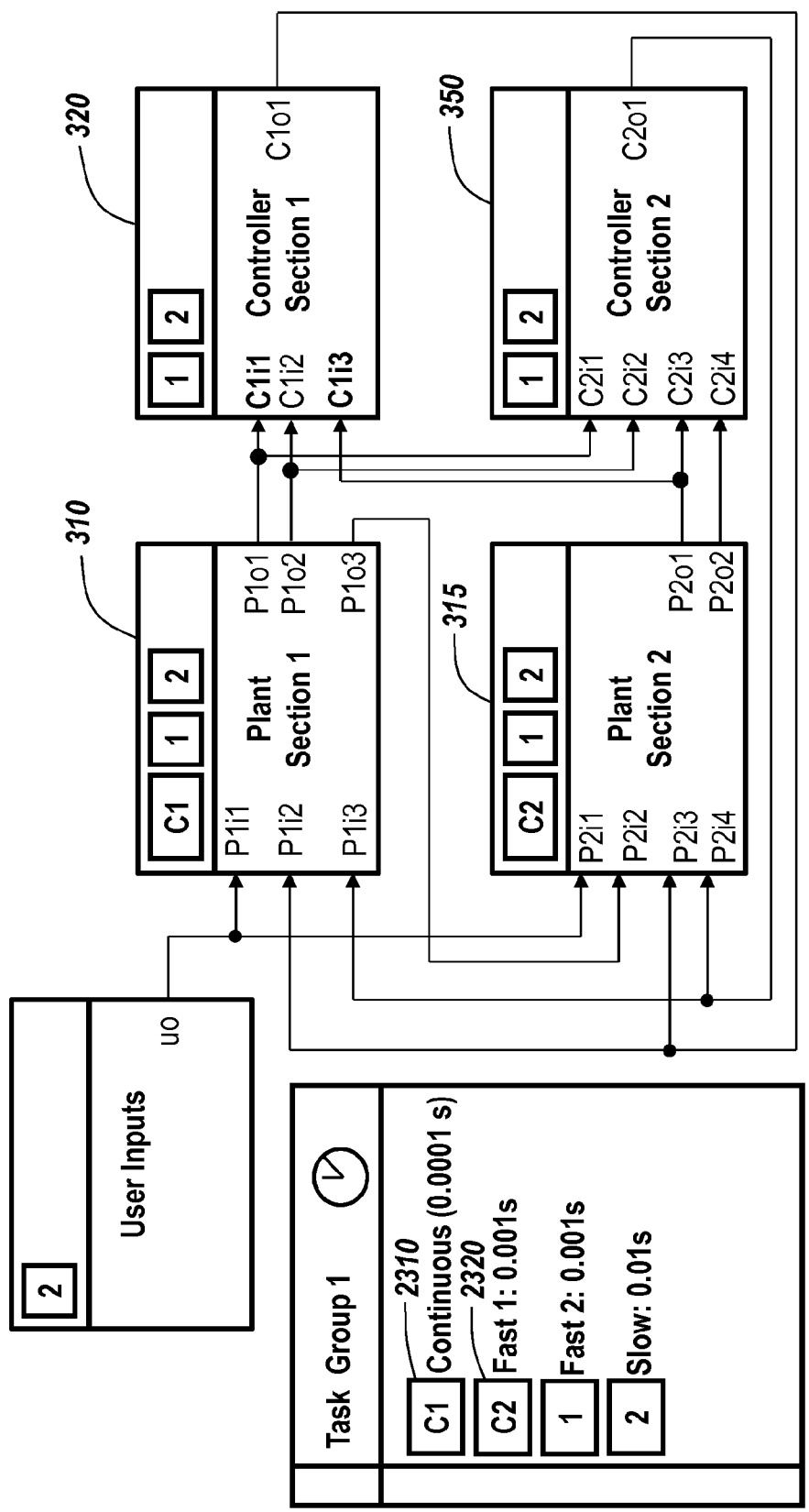
FIGS. 23A and 23B illustrate an embodiment that accounts for computational complexity of certain sub graphs in a model.

FIG. 23A illustrates an embodiment in which the model of FIG. 3 is presented with the assumption that the higher computational complexity resides in the continuous-time sub graphs. FIG. 23A illustrates an alternative mapping in which two compute elements are reserved for the continuous-time sub graphs in the plant section components 310 and 315. The other two tasks map to all sub graphs of sample time 0.01 s and 0.001 s, respectively. In the embodiment of FIG. 23A, the continuous-time system of equations are solved in two independent instances of the same fixed-step solver that run on two separate compute elements. The sub graphs mapped to the two compute elements may then be configured to have communication in the minor time steps of the solvers or the major time steps of the solver to get finer or coarser approximations of the solutions to the differential equations.

By way of example, consider the case in which the communication occurs in minor time steps of the solvers. In this case, the communication method is designed to be mathematically modeled by a delay in which the delay value is equal to the fixed-step size of the fixed-step solver. During simulation, a user may use a single fixed-step solver (e.g., one employed in the Simulink environment) such that the communication link is replaced by the Simulink environment's transport delay block (i.e., a delay value equal to fixed-step size).

For parallel execution an exemplary implementation can include one solver instance for the first compute element (C1) 310 and another solver loop for the second compute element (C2) 320. In one implementation, the solver loop may be implemented by producing two instances of the original single fixed-step solver. One instance is for C1 310, the other is for C2 320.

The implementation may further consist of, for example, a Simulink S-Function block in C1 310 which determines that the signal is communicating.

In the j-th major step, the S-Function uses a buffer to record intermediate values of the observed signal $V_j=(v(t_j), v(t_j+h/2), v(t_j+h))$ in which y denotes the observed signal, h is the fixed step size and v(t) is and approximation of y(t) which may be obtained by interpolation or extrapolation (such as the algorithm used by the Transfer Delay block of Simulink). This vector of values is written to a shared double-buffer.

The implementation further consists of a Simulink S-Function block in C2 320 which determines the vector of values $V_{j-1}$ in the j-th time step by reading from the double buffer. Consequently, within C2 320, we may now use these values to solve a differential equation $$z(t)'=f(t,z(t),y(t-h)) \quad \text{(Eq. 1)}$$

by first computing the coefficients:

$$k_1=h*f(t_j,z(t_j),v(t_{j-1})) \quad \text{(Eq. 2)}$$

$$k_2=h*f(t_j+h/2,z(t_j)+k_1/2,v(t_{j-1}+h/2)+k_1/2) \quad \text{(Eq. 3)}$$

$$k_3=h*f(t_j+h/2,z(t_j)+k_2/2,v(t_{j-1}+h/2)+k_2/2) \quad \text{(Eq. 4)}$$

$$k_4=h*f(t_j+h,z(t_j)+k_3,v(t_{j-1}+h)+k_2/2) \quad \text{(Eq. 5)}$$

and such that the solution of z(t) is given by the 4-th order Runge-Kutta method as:

$$z(t_{j+1})=z(t_j)+(1/6)(k1+2*k2+2*k3+k4), \text{ for each } j=0,1,2, \quad \text{(Eq. 6)}$$

With respect to the above example, it is noted that the solution identically matches the solution as if a single-solver were used in which the communication delay is a mathematical model of a delay.

In the example above, the shared double-buffer was assumed to be configured to ensure deterministic transfer (independently of implementation). The shared double-buffer may also be configured for 'ensure data integrity only' in which case the delay model depends on implementation.

The quality of the approximation is determined by how well the computed signal v(t) approximates the true signal y(t). In general, this is achieved by using extrapolation methods which perform better by using more memory (longer history of the true signal). In the extreme case, the extrapolation may be reduced to use only major step data, which may reduce the quality of the approximation but improve (1) the amount of memory required to computed the approximation (e.g., use less memory), and (2) the amount of memory required for communication. In an implementation, these tradeoffs may be parameterized by allowing the user to specify a buffer size which would be used by the S-Function in C1 (similar to the way the Transport Delay block of Simulink specifies a buffer size).

Figure 23B:
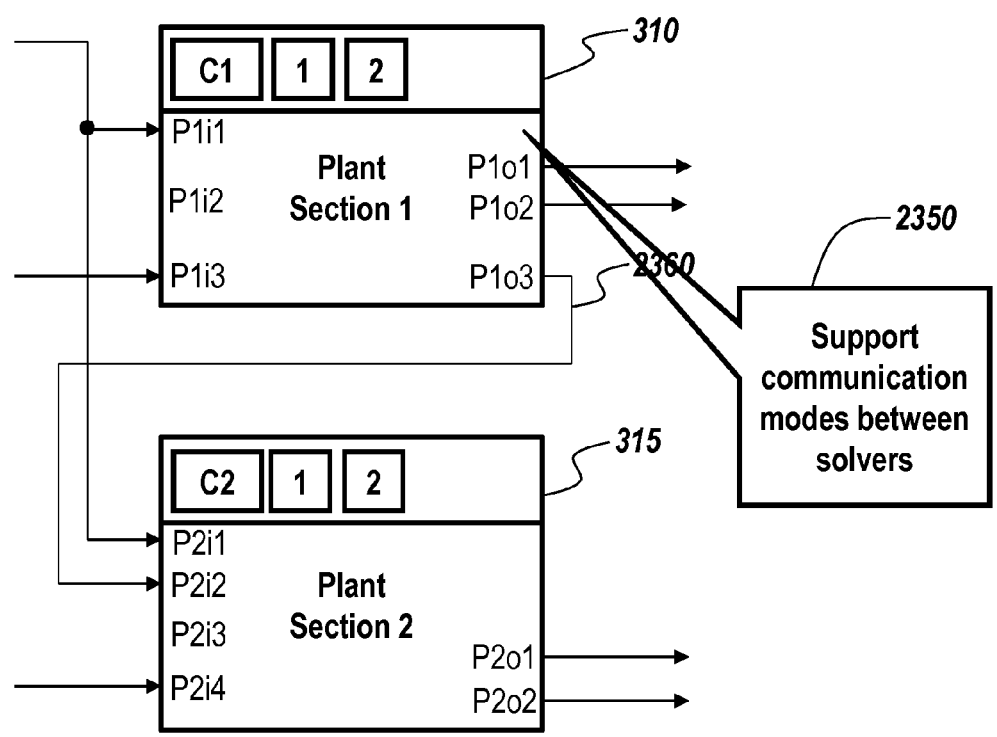

FIG. 23B illustrates a portion of the model in which a help window 2350 can be used to inform a user about a component or line in a model. For example, help window 2350 may inform a user about the purpose of signal line 2360, namely supporting communication between solvers used with the model.

Exemplary Architecture

Figure 24:
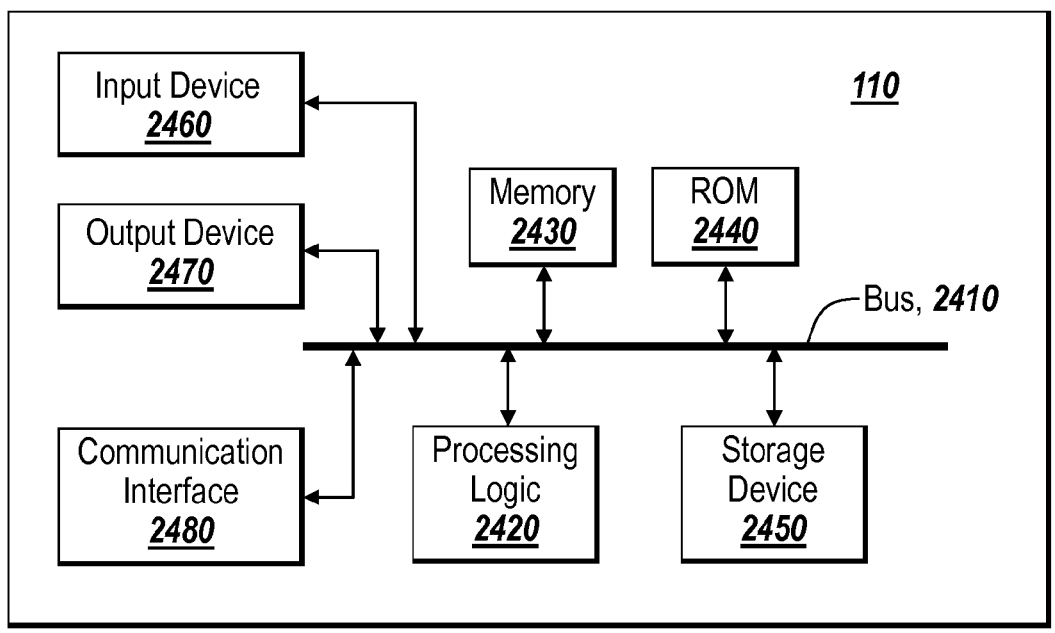
FIG. 24 illustrates an exemplary architecture for performing computing operations consistent with principles of the invention.

FIG. 24 illustrates an exemplary computer architecture that can be used to implement computer 110 of FIG. 1. FIG. 24 is an exemplary diagram of an entity corresponding to computer 110. As illustrated, the entity may include a bus 2410, processing logic 2420, a main memory 2430, a read-only memory (ROM) 2440, a storage device 2450, an input device 2460, an output device 2470, and/or a communication interface 2480. Bus 2410 may include a path that permits communication among the components of the entity.

Processing logic 2420 may include a processor, microprocessor, or other types of processing logic (e.g., FPGA, GPU, DSP, ASIC, etc.) that may interpret and execute instructions. For an implementation, processing logic 2420 may include a single core processor or a multi-core processor. In another implementation, processing logic 2420 may include a single processing device or a group of processing devices, such as a processing cluster or computing grid. In still another implementation, processing logic 2420 may include multiple processors that may be local or remote with respect each other, and may use one or more threads while processing.

Main memory 2430 may include a random access memory (RAM) or another type of dynamic storage device that may store information and instructions for execution by processing logic 2420. ROM 2440 may include a ROM device or another type of static storage device that may store static information and/or instructions for use by processing logic 2420. Storage device 2450 may include a magnetic, solid state and/or optical recording medium and its corresponding drive, or another type of static storage device that may store static information and/or instructions for use by processing logic 2420.

Input device 2460 may include logic that permits an operator to input information to the entity, such as a keyboard, a mouse, a pen, a touchpad, an accelerometer, a microphone, voice recognition, camera, neural interface, biometric mechanisms, etc. In an embodiment, input device 2460 may correspond to input device 125.

Output device 2470 may include a mechanism that outputs information to the operator, including a display, a printer, a speaker, a haptic interface, etc. In an embodiment, output device 2470 may correspond to display device coupled to computer 110. Communication interface 2480 may include any transceiver-like logic that enables the entity to communicate with other devices and/or systems. For example, communication interface 2480 may include mechanisms for communicating with another device or system via a network.

The entity depicted in FIG. 24 may perform certain operations in response to processing logic 2420 executing software instructions stored in a computer-readable storage medium, such as main memory 2430. A computer-readable storage medium may be defined as a physical or logical memory device. The software instructions may be read into main memory 2430 from another computer-readable storage medium, such as storage device 2450, or from another device via communication interface 2480. The software instructions contained in main memory 2430 may cause processing logic 2420 to perform techniques described herein when the software instructions are executed on processing logic. Alternatively, hardwired circuitry may be used in place of or in combination with software instructions to implement techniques described herein. Thus, implementations described herein are not limited to any specific combination of hardware circuitry and software.

Although FIG. 24 shows exemplary components of the entity, in other implementations, the entity may contain fewer, different, or additional components than depicted in FIG. 24. In still other implementations, one or more components of the entity may perform one or more tasks described as being performed by one or more other components of the entity.

Exemplary Processing

Figure 25:
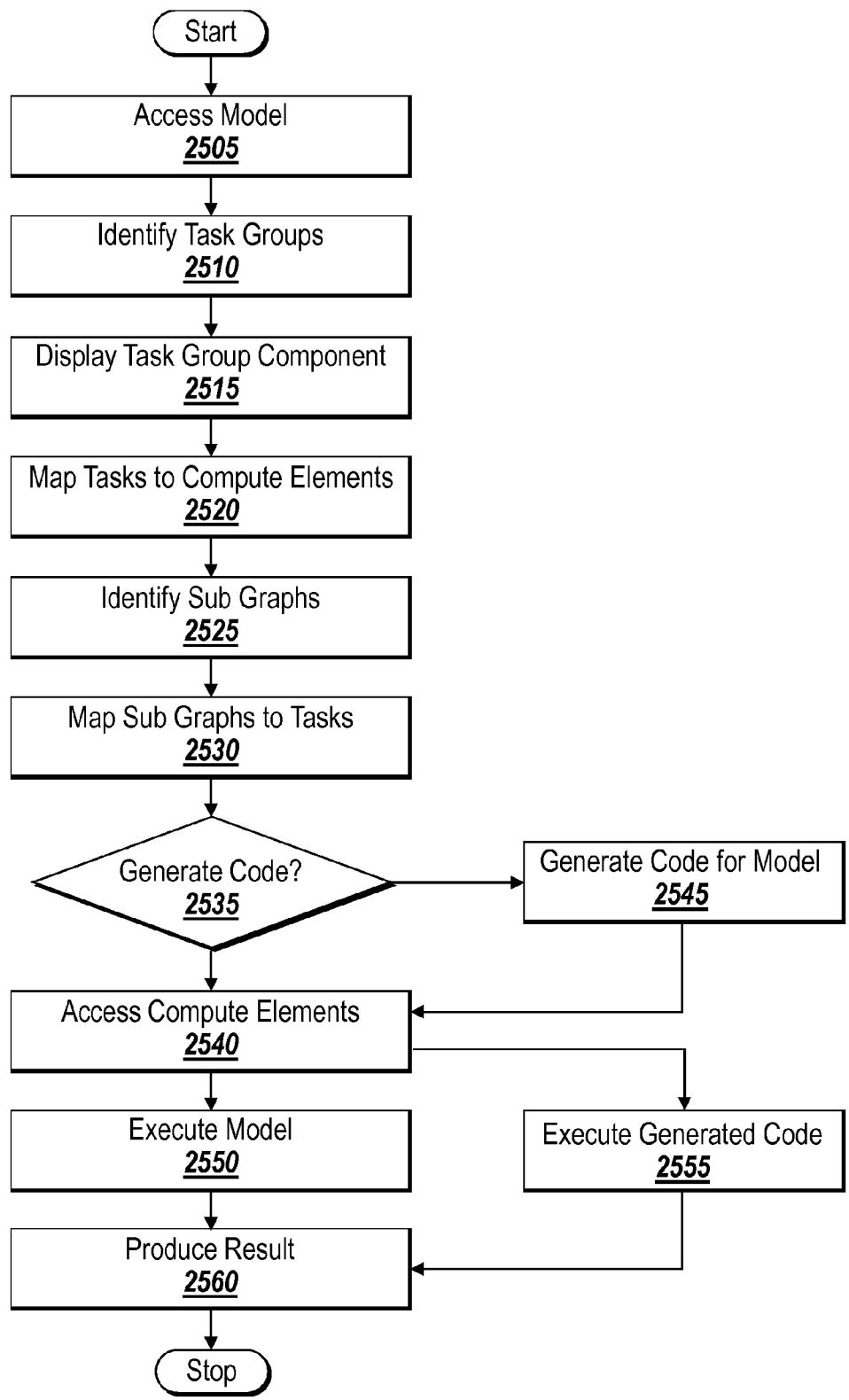
FIG. 25 illustrates exemplary processing for practicing an embodiment of the invention.

FIG. 25 illustrates exemplary processing for practicing an embodiment of the invention. A model may be accessed programmatically or by a user (act 2505). For example, a user may open a model that includes components that the user wishes to execute in a parallel processing environment. Task groups may be identified when the model has been accessed (act 2510). For example, a user may create task group that can include tasks that are executed in the parallel processing environment. Tasks can represent threads, processes, concurrent computing resources, etc., consistent with principles of the invention.

The task group may be displayed via a task group component, such as task group 330 (FIG. 3) (act 2515). Tasks in the task group may be mapped to compute elements that perform parallel processing of the model when the model is executed (act 2520). Embodiments may graphically map tasks to compute elements via user inputs, or may use APIs that support programmatic mapping operations. Embodiment can further map tasks to compute elements in a number of ways, such as mapping a single task to a single compute element or mapping two or more tasks to a compute element.

Sub graphs may be identified using a user input or programmatically (act 2525). For example, a user may select a number of model components, such as blocks, and may graphically group the blocks into a sub graph having a determined sample rate (e.g., 0.001 s). The user may perform this operation for other blocks in the model to create additional sub graphs. Sub graphs may be mapped to tasks in the task group (act 2530). Embodiments may allow users to map sub graphs to tasks using keyboard inputs, drag and drop operations, user interfaces, scripts, etc. Embodiments may further map sub graphs to tasks programmatically using one or more programmatic APIs.

A determination may be made as to whether code should be generated for the model (act 2535). When code is not generated, concurrent computing elements may be accessed by the model (act 2540). The accessed concurrent computing elements may execute tasks when the model is executed (act 2550). A concurrent computing result may be produced when the model is executed (act 2560).

In contrast, when code is generated for the model (act 2545), concurrent computing elements may be accessed once the code is generated (act 2540). The generated code may be executed on the concurrent computing elements (act 2555) and a concurrent computing result may be produced using the generated code (act 2560). In some embodiments, generated code may be configured to run on a target environment, such as an embedded system that employs two or more processing devices, threads, etc.

CONCLUSION

Implementations may allow users to interactively design, configure, and execute graphical models using concurrent computing resources.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 25, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. For example, devices and/or entities may be added and/or removed from the implementations of FIGS. 1, 2 and 24 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining the invention.

The scope of the invention is defined by the claims and their equivalents.

What is claimed is:

1. A computer-implemented method comprising:
   interacting with an executable block diagram model,
      the block diagram model including a first component and a second component, and
      interacting with the block diagram model being performed by a processor;
   partitioning the block diagram model graphically,
      partitioning the block diagram model being performed by the processor, and
      the partitioning associating:
         a first sub graph with the first component,
            the first sub graph performing a first operation during an execution of the block diagram model, and
         a second sub graph with the second component,
            the second sub graph performing a second operation during the execution of the block diagram model;
   identifying a task group component,
      identifying the task group component being performed by the processor, and
      the task group component including:
         a first task identifier,
            the first task identifier identifying a first task,
               the first task being associated with a first concurrent computing resource,
               the first task executing on the first concurrent computing resource during the execution of the block diagram model,
            the first task identifier being graphically associated with the first sub graph and allowing the first sub graph to execute on the first concurrent computing resource during the execution of the block diagram model, and
         a second task identifier,
            the second task identifier identifying a second task,
               the second task being associated with a second concurrent computing resource,
               the second task executing on the second concurrent computing resource during the execution of the block diagram model,
            the second task identifier being graphically associated with the second sub graph and allowing the second sub graph to execute on the second concurrent computing resource during the execution of the block diagram model;
   executing causing the execution of the block diagram model,
      causing the execution of the block diagram model being performed by the processor, and
      the executing the execution of the block diagram model including:
         executing the first sub graph on the first concurrent computing resource concurrently with the second sub graph executing on the second concurrent computing resource, and
   obtaining an execution result,
      obtaining the execution result being performed by the processor.

2. The computer-implemented method of claim 1, where:
   the first sub graph and the second sub graph are associated with sub graph identifiers, and
   task identifiers or the sub graph identifiers graphically represent a number of concurrent computing resources that include the first concurrent computing resource and the second concurrent computing resource.

3. The computer-implemented method of claim 1, where:
   the first sub graph and the second sub graph have sub graph identifiers for visually indicating the first sub graph and the second sub graph, and
   the sub graph identifiers are used to map the first sub graph and the second sub graph to the first concurrent computing resource and the second concurrent computing resource.

4. The computer-implemented method of claim 1, where partitioning the block diagram model includes:
   hierarchically partitioning the block diagram model using the first component and the second component.

5. The computer-implemented method of claim 1, where:
   the first task has a first sample time and the second task has a second sample time, and
   where partitioning the block diagram model includes:
      partitioning the block diagram model based on the first sample time or the second sample time.

6. The computer-implemented method of claim 5, where the first sample time and the second sample time are the same.

7. The computer-implemented method of claim 1, where the first task is a continuous task or the second task is a continuous task.

8. The computer-implemented method of claim 1, where the block diagram model is interpretively executed.

9. The computer-implemented method of claim 1, further comprising:
   generating code for the block diagram model prior to the execution of the block diagram model; and
   where the execution of the block diagram model further includes:
      executing the generated code.

10. The computer-implemented method of claim 9, where the generated code is configured for real-time execution on the first concurrent computing resource and the second concurrent computing resource.

11. The computer-implemented method of claim 1, where the first concurrent computing resource and the second concurrent computing resource are associated with one or more target environments.

12. The computer-implemented method of claim 1, where the first concurrent computing resource and the second concurrent computing resource are threads or processes of an operating system operating on a parallel platform.

13. The computer-implemented method of claim 1, where the first concurrent computing resource and the second concurrent computing resource are cores.

14. The computer-implemented method of claim 1, where the block diagram model is partitioned based on receiving a user input.

15. The computer-implemented method of claim 1, where:
   the first task and the second task are mapped to the first sub graph and the second sub graph, respectively, using a programmatic application program interface (API), or
   the first sub graph and the second sub graph are mapped to the first concurrent computing resource and the second concurrent computing resource, respectively, using the programmatic API.

16. One or more non-transitory computer-readable media storing instructions, the instructions comprising:

one or more instructions that, when executed on a processor, cause the processor to:
  interact with an executable block diagram model,
    the block diagram model includes a first component and a second component;
  partition the block diagram model graphically,
    the partitioning associating:
      a first sub graph with the first component,
        the first sub graph performing a first operation during an execution of the block diagram model, and
      a second sub graph with the second component,
        the second sub graph performing a second operation during the execution of the block diagram model;
  identify a task group component,
    the task group component including:
      a first task identifier,
        the first task identifier identifying a first task,
        the first task being associated with a first concurrent computing resource,
        the first task executing on the first concurrent computing resource during the execution of the block diagram model,
        the first task identifier being graphically associated with the first sub graph and allowing the first sub graph to execute on the first concurrent computing resource during the execution of the block diagram model, and
      a second task identifier,
        the second task identifier identifying a second task,
        the second task being associated with a second concurrent computing resource,
        the second task executing on the second concurrent computing resource during the execution of the block diagram model,
        the second task identifier being graphically associated with the second sub graph and allowing the second sub graph to execute on the second concurrent computing resource during the execution of the block diagram model; and
  cause the execution of the block diagram model,
    where the executing the execution of the block diagram model causing:
      the first sub graph to execute on the first concurrent computing resource concurrently with the second sub graph executing on the second concurrent computing resource, and
      produces a generation of an execution result.

* * * * *

UNITED STATES PATENT AND TRADEMARK OFFICE
CERTIFICATE OF CORRECTION

Page 1 of 1

PATENT NO.          : 8,756,044 B2
APPLICATION NO.     : 12/895209
DATED               : June 17, 2014
INVENTOR(S)         : Ramamurthy Mani et al.

It is certified that error appears in the above-identified patent and that said Letters Patent is hereby corrected as shown below:

In the Claims

Please correct Claim 16 to read as follows:

Colum 26, Line 25, before "a generation of an execution result" delete "produces".

Signed and Sealed this
Twentieth Day of January, 2015

Michelle K. Lee
*Deputy Director of the United States Patent and Trademark Office*